(12) United States Patent
Gulla et al.

(10) Patent No.: US 9,386,791 B2
(45) Date of Patent: Jul. 12, 2016

(54) DAIRY PRODUCT AND PROCESS

(71) Applicant: FONTERRA CO-OPERATIVE GROUP LIMITED, Auckland (NZ)

(72) Inventors: Rama Mohana Rao Gulla, Auckland (NZ); Roger Richard Schwarzenbach, Auckland (NZ); Esra Cakir-Fuller, Auckland (NZ)

(73) Assignee: FONTERRA CO-OPERATIVE GROUP LIMITED, Auckland (NZ)

( * ) Notice: Subject to any disclaimer, the term of this patent is extended or adjusted under 35 U.S.C. 154(b) by 0 days.

(21) Appl. No.: 14/355,803

(22) PCT Filed: Nov. 2, 2012

(86) PCT No.: PCT/IB2012/056103
§ 371 (c)(1),
(2) Date: May 1, 2014

(87) PCT Pub. No.: WO2013/065014
PCT Pub. Date: May 10, 2013

(65) Prior Publication Data
US 2014/0314851 A1    Oct. 23, 2014

Related U.S. Application Data

(60) Provisional application No. 61/554,926, filed on Nov. 2, 2011, provisional application No. 61/699,709, filed on Sep. 11, 2012.

(51) Int. Cl.
*A23L 1/29* (2006.01)
*A23J 1/20* (2006.01)
*A23J 3/08* (2006.01)
*A23C 21/08* (2006.01)
*A23L 1/305* (2006.01)

(52) U.S. Cl.
CPC ............... *A23L 1/296* (2013.01); *A23C 21/08* (2013.01); *A23J 1/20* (2013.01); *A23J 3/08* (2013.01); *A23L 1/3056* (2013.01); *A23V 2002/00* (2013.01)

(58) Field of Classification Search
CPC ...... A23L 1/296; A23L 1/3056; A23C 21/08; A23J 3/08; A23J 1/20; A23V 2002/00; A23V 2250/54252
USPC .................... 424/489; 426/520, 648
See application file for complete search history.

(56) References Cited

FOREIGN PATENT DOCUMENTS

| | | |
|---|---|---|
| EP | 1 314 361 | 5/2003 |
| EP | 2 250 906 | 11/2010 |
| WO | WO 2009/072884 | 6/2009 |
| WO | WO 2009/113845 | 9/2009 |
| WO | WO 2009/113858 | 9/2009 |
| WO | WO 2009/113858 A1 * | 9/2009 |

(Continued)

OTHER PUBLICATIONS

International Search Report and Written Opinion mailed Mar. 28, 2013 in Application No. PCT/IB2012/056103.

(Continued)

*Primary Examiner* — Blessing M Fubara
(74) *Attorney, Agent, or Firm* — Knobbe, Martens, Olson & Bear LLP

(57) ABSTRACT

The invention relates to liquid nutritional compositions, particularly shelf stable liquid nutritional compositions including compositions comprising non-hydrolyzed whey protein, and methods of producing and using these compositions.

19 Claims, 7 Drawing Sheets

(56) References Cited

FOREIGN PATENT DOCUMENTS

| WO | WO 2010/143939 | 12/2010 |
|---|---|---|
| WO | WO 2012/081971 | 6/2012 |

OTHER PUBLICATIONS

European Extended Search Report mailed Aug. 5, 2015 in Application No. 12846628.1-1358 / 2773222 PCT/IB2012056103, filed Jul. 1, 2015.

"$F_o$ a technical note—What it means—How to calculate it—How to use it for adjustment, control and validation of moist-heat sterilization processes," R&D Fedegari, 1988, 33 pages.

Wijayanti et al., "Stability of whey proteins during thermal processing: A review," Comprehensive Reviews in Food Science and Food Safety, 2014, pp. 1235-1251, vol. 13, Institute of Food Technologists.

"Commission Directive 1999/21/EC of Mar. 25, 1999 on dietary foods for special medical purposes", Official Journal of the European Communities L 91/29, Apr. 7, 1999.

\* cited by examiner

DAIRY PRODUCT AND PROCESS

FIELD OF THE INVENTION

The invention relates to high protein liquid nutritional foods and methods for their preparation and use.

BACKGROUND OF THE INVENTION

A range of specialized foods (meal replacers and/or meal supplements) exist for elderly or convalescents or other patients that cannot get the nutrition required by eating normal foods or are unable to feed themselves or require assistance during feeding. Generic terms used to categorise these foods include "medical foods", "enteral foods", "enteral nutrition", "medical liquids", and the like, and are collectively used to refer to foods that are taken under the supervision of a medical professional. In some jurisdictions medical foods/enteral nutrition has a legal definition. In the USA, the term medical food, as defined in section 5(b) of the Orphan Drug Act (21 U.S.C. 360ee (b) (3)) is "a food which is formulated to be consumed or administered enterally under the supervision of a physician and which is intended for the specific dietary management of a disease or condition for which distinctive nutritional requirements, based on recognized scientific principles, are established by medical evaluation". In some jurisdictions, such foods are available to the public only by prescription, in others they can be procured directly over the counter (OTC).

Enteral formulas are ingested both orally and through tubes. Oral ingestion is useful when nutrient supplements are necessary and both the digestive tract and the patient are capable of taking them. Tube feeding is necessary for patients who need supplements but cannot take nutrition orally.

All these foods have very exacting requirements. They require a high degree of heat treatment to provide sterility and long shelf life stability, high calorific density, i.e. highly concentrated doses of nutrients, but at the same time low viscosity so that they can be readily administered to the patient and consumed easily. In order to obtain a long shelf life of the liquid compositions sterilization is the preferred heat treatment, in particular ultra high temperature (UHT), wherein the product is heated (indirectly by means of heating coils or directly by live steam under pressure) at 135-150° C. and held at this temperature for 4-10 seconds, followed by aseptic packaging. Another possibility is the so called retort process, wherein the product is sterilized by sealing in cans which are then heated in an autoclave at 110-130° C. for 10-20 minutes.

Liquid nutritional foods are also used by healthy subjects as meal replacers or when a rapidly consumable feed is required. Liquid nutritional foods are generally suitable for use by children, the aged or by athletes and for these consumers the organoleptic properties of the product such as, for instance viscosity, mouthfeel, smell and colour are very important.

Whey protein is recognised as a suitable protein source to treat persons suffering from diseases or conditions or as a result of treatment for a disease or condition, such as from cachexia, sarcopenia, as well as a valuable source of nutrition for healthy persons, such as sportsmen and active elderly. As a source of whey protein to be used in the present invention, any commercially available whey protein source may be used, i.e. whey obtained by any process for the preparation of whey known in the art, as well as whey protein fractions prepared thereof, or the proteins that constitute the bulk of the whey proteins being β-lactoglobulin, α-lactalbumin and serum albumin, such as liquid whey, or whey in powder form, such as whey protein isolate (WPI) or whey protein concentrate (WPC). However, it will be appreciated that whey protein or whey protein fractions without suitable processing will typically form a gel when heated under certain conditions (heating above pH 6.5 results in firm elastic gels; whilst coagula are formed below pH 6.5) and that the formation of a gel is detrimental to formulation of the heat stable liquid nutritional compositions.

It has been reported that the heat stability of whey protein-stabilised emulsions is particularly sensitive to pH and ionic strength (Demetriades K & McClements D J (1998), *Influence of pH and heating on physicochemical properties of whey protein-stabilized emulsions containing a non-ionic surfactant*. Journal of Agricultural and Food Chemistry, 46, 3936-3942; Demetriades K, Coupland J N & McClements D J (1997), *Physical properties of whey protein stabilized emulsions as related to pH and NaCl*. Journal of Food Science, 62, 342-347; Hunt J A & Dalgleish D G (1995), *Heat stability of oil-in-water emulsions containing milk proteins: effect of ionic strength and pH*. Journal of Food Science, 60, 1120-1123). At a pH near the isoelectric point (pI) of the proteins the charge on the protein-containing droplets is low, and therefore protein-protein interactions are favoured and protein aggregation occurs rapidly.

However, when the pH is adjusted away from the pI (weighted average of the principal whey proteins is pH 5.0), charges on the protein molecules are increased. Greater electrostatic repulsive forces must be overcome for aggregation to occur, and therefore the rate of aggregation is slowed. Previously, in order to produce a low viscosity emulsion with a long shelf-life, whey proteins could only be used when the pH of the system was sufficiently distant from the isoelectric point of the whey proteins, i.e. <pH 4 or >pH 6, to avoid the formation of a high-viscosity liquid, paste or gel.

It is also reported that the presence of divalent (i.e. calcium and magnesium) and/or monovalent (i.e. sodium, potassium) cations adversely affect the physicochemical properties and stability of protein stabilised emulsions (Keowmaneechai E & McClements D J (2002), *Effect of $CaCl_2$ and KCl on physiochemical properties of model nutritional beverages based on whey protein stabilized oil-in-water emulsions*. Journal of Food Science, 67, 665-671; Kulmyrzaev A A, & Schubert H (2004), *Influence of KCl on the physicochemical properties of whey protein stabilized emulsions*. Food Hydrocolloids, 18, 13-19; Ye A & Singh H (2000), *Influence of calcium chloride addition on the properties of emulsions stabilized by whey protein concentrate*. Food Hydrocolloids, 14, 337-346). Increasing the ionic strength of the aqueous phase by adding minerals can cause electrostatic screening of the charges on the proteins, which leads to decreased electrostatic repulsion between droplets and thus promotes aggregation. Divalent ions can have more pronounced effects than monovalent ions. As will be appreciated by those skilled in the art, the higher the protein concentrations in the composition, lower quantities of minerals would be sufficient to generate the adverse effect.

It is well known in the prior art that high temperature processing can lead to the generation of a sulphurous off-flavour in whey protein containing emulsions such as milk (Steely J S (1994) *Chemiluminescence detection of sulphur compounds in cooked milk*. In: Sulfur compounds in Foods, ACS Symposium Series 564). pH has been shown to have a significant effect on the heat-activated sulfhydryl (—SH) groups of skim milk whey that evolves during heating to at least 90° C. As the pH of the whey is lowered below pH 6.0, the quantity of sulphides evolved is decreased. In contrast, an increase in pH above 6 to about pH 9 is accompanied by an increase in the amount of heat volatile sulphides (Townley R C & Gould I A (1943), *A quantitative study of the heat labile sulfides of milk. III. Influence of pH, added compounds, homogenization and sunlight* Journal of Dairy Science, 26, 853-867). In spite of the flavour benefits at pHs below 6.0, it is well known in the prior art that decreasing the pH of the composition to around the isoelectric point would lead to limited processability since whey proteins are prone to aggregation in this pH range.

It is an object of the invention to overcome these difficulties and to provide high protein liquid nutritional compositions having desirable pH and heat stability, or to provide the public with a useful choice.

SUMMARY OF THE INVENTION

In one aspect the invention provides a liquid nutritional composition comprising
  a) from about 2% to about 25% by weight of protein that has been heated to at least 70° C. or wherein at least about 55% of the heat-denaturable protein is denatured;
  b) from 0 to about 30% by weight fat;
  c) from about 0% to about 45% by weight carbohydrate;
and wherein the nutritional composition has a pH of between about 4 to about 6, and
  d) a viscosity of less than 200 cP at a temperature of 20° C. and a shear rate of 100 s–1, or
  e) an average particle size of less than 20 μm as categorised by the volume weighted average particle size parameter D[4,3], or
  f) exhibits essentially no observable gelation or aggregation, or
  g) any combination of two or more of (d) to (f) above.

In one aspect the invention provides a shelf stable liquid nutritional composition comprising
  a) from about 2% to about 25% by weight of non-hydrolysed whey protein ingredient that has been heated to at least 70° C. or wherein at least about 55% of the heat-denaturable protein is pre-denatured;
  b) from 0 to about 30% by weight fat;
  c) from about 0% to about 45% by weight carbohydrate;
and wherein the nutritional composition has a pH of between about 4 to about 6, and
  d) a viscosity of less than 200 cP at a temperature of 20° C. and a shear rate of 100 s–1, or
  e) an average particle size of less than 20 μm as categorised by the volume weighted average particle size parameter D[4,3], or
  f) exhibits essentially no observable gelation or aggregation, or
  g) any combination of two or more of (d) to (f) above.

In another aspect the invention provides a liquid nutritional composition comprising
  a) from about 2% to about 25% by weight of non-hydrolysed whey protein, wherein the whey protein comprises or is provided by an ingredient that comprises at least about 55% of the heat-denaturable protein present in a denatured state,
  b) from 0 to about 30% by weight fat
  c) from about 0% to about 45% by weight carbohydrate
and wherein the nutritional composition has when at a pH of between 4 and 6 undergone a heat treatment with an $F_o$-value of at least equivalent to 90° C. for 40 s, and has
  d) a viscosity of less than 200 cP when measured at 20° C. and shear rate of 100 s$^{-1}$, or
  e) an average particle size of less than 20 μm as categorised by the volume weighted average particle size parameter D[4,3], or
  f) exhibits essentially no observable gelation or aggregation, or
  g) any combination of two or more of (d) to (f) above.

In one embodiment, the heat treatment is at least equivalent to 121° C. for 10 minutes, for example is at least equivalent to 140° C. for 5 s, such as to provide microbial control and a shelf stable product.

In various embodiments the nutritional composition is heat-stable, for example the composition is in a liquid state in which essentially no gelation, or aggregation is observed in the beverage, for example either directly after heat treatment or after prolonged storage at temperatures of about 20° C., e.g. at least 3 months, or preferably at least 6 months or 12 months.

In one embodiment the invention relates to a liquid nutritional composition comprising
  a) from about 2% to about 25% by weight of non-hydrolysed whey protein
  b) from 0 to about 30% by weight fat
  c) from about 0% to about 45% by weight carbohydrate
and wherein the liquid nutritional composition has undergone when at a pH of between 4 and 6 a heat treatment with an $F_o$-value of at least equivalent to 90° C. for 40 s, and wherein the liquid nutritional composition has a viscosity of less than 200 cP when measured at 20° C. and shear rate of 100 s$^{-1}$.

In certain embodiments, the protein in the nutritional liquid composition is provided by an ingredient, for example a dry ingredient, wherein at least about 55% of the heat denaturable protein is pre-denatured.

In another aspect the invention provides a shelf stable liquid nutritional composition comprising
  a) from about 2% to about 25% by weight of non-hydrolysed whey protein ingredient wherein at least about 55% of the heat-denaturable protein is pre-denatured
  b) from 0 to about 30% by weight fat
  c) from about 0% to about 45% by weight carbohydrate
  d) as monovalent or divalent cations minerals at least to the levels as recommended by the European Commission Food for Special Medical Purposes (FSMP) directive.
and wherein the nutritional composition has undergone when at a pH of between 4 and 6 a heat treatment with an $F_o$-value of at least equivalent to 90° C. for 40 s, for example at least equivalent to 121° C. for 10 minutes, or from at least equivalent to 140° C. for 5 s.

In one embodiment, the liquid nutritional composition comprises
  a) from about 2% to about 25% by weight of non-hydrolysed whey protein wherein at least 55% of the heat-denaturable whey protein is denatured
  b) from 0 to about 30% by weight fat
  c) from about 0% to about 45% by weight carbohydrate
and wherein the liquid nutritional composition has undergone when at a pH of between 4 and 6 a heat treatment with an $F_o$-value of at least equivalent to 90° C. for 40 s, and wherein the liquid nutritional composition has a viscosity of less than 200 cP when measured at 20° C. and shear rate of 100/s.

The heat treatment can preferably be at least equivalent to 121° C. for 10 minutes or most preferably at least equivalent to 140° C. for 5 s to provide a shelf stable product, and wherein the nutritional composition is heat-stable meaning the formulation is in a liquid state in which essentially no gelation, or aggregation is observed in the beverage, either directly after heat treatment or after prolonged storage at temperatures of about 20° C., e.g. at least 3 months, or preferably at least 6 months or 12 months.

In a further aspect, the invention relates to a method of preparing a liquid nutritional composition, the method comprising
- a) heat-treating a liquid composition having a pH of between 4 and 6 and comprising about 2% to about 25% by weight of non-hydrolysed whey protein, wherein the whey protein comprises or is provided by an ingredient that comprises at least about 55% of the heat-denaturable protein present in a denatured state, and wherein the heat treatment has an $F_o$-value of at least equivalent to 90° C. for 40 s, and
- b) recovering the liquid composition, wherein the liquid composition has
- c) a viscosity of less than 200 cP when measured at 20° C. and shear rate of 100 s−1, or
- d) an average particle size of less than 20 μm as categorised by the volume weighted average particle size parameter D[4,3], or
- e) exhibits essentially no observable gelation or aggregation, or
- f) any combination of two or more of (c) to (e) above.

In one embodiment, the liquid composition has a pH of greater than 4.5 when heat treated.

In various embodiments, the heat treatment is for microbial control, wherein the recovery of step (b) is of a sterile liquid composition.

In one exemplary embodiment, prior to packaging or consumption the liquid composition undergoes no heat treatment other than the heat treatment of step (a). In one exemplary embodiment, prior to packaging or consumption the liquid composition undergoes no further sterilisation. In one exemplary embodiment, prior to packaging or consumption no further ingredients are added to the liquid composition, such that its composition is unchanged.

In one embodiment, recovery of the liquid composition comprises or consists of aseptic handling, bottling, or packaging, or any combination thereof.

In another embodiment, the invention provides a method of preparing a liquid nutritional composition, the method comprising
- a) providing a liquid composition having a pH of between 4 and 6 and comprising about 2% to about 25% by weight of non-hydrolysed whey protein wherein the whey protein is provided by a dry ingredient that comprises at least about 55% of the heat-denaturable protein present in a denatured state,
- b) heat-treating the liquid composition with a heat treatment having an $F_o$-value of at least equivalent to 90° C. for 40 s, and
- c) recovering the liquid composition, wherein the recovered liquid composition has
- d) a viscosity of less than 200 cP when measured at 20° C. and shear rate of 100 s−1, or
- e) an average particle size of less than 20 μm as categorised by the volume weighted average particle size parameter D[4,3], or
- f) exhibits essentially no observable gelation or aggregation, or
- g) any combination of two or more of (d) to (f) above.

In one embodiment, the invention provides a method of preparing a liquid nutritional composition, the method comprising
- a) providing a liquid composition having a pH of between 4 and 6 and comprising about 2% to about 25% by weight of non-hydrolysed whey protein wherein the whey protein comprises or is provided by an ingredient that comprises at least about 55% of the heat-denaturable protein present in a denatured state,
- b) with no pH adjustment heat-treating the liquid composition with a heat treatment having an $F_o$-value of at least equivalent to 90° C. for 40 s, and
- c) recovering the liquid composition, wherein the liquid composition has
- d) a viscosity of less than 200 cP when measured at 20° C. and shear rate of 100 s−1, or
- e) an average particle size of less than 20 μm as categorised by the volume weighted average particle size parameter D[4,3], or
- f) exhibits essentially no observable gelation or aggregation, or
- g) any combination of two or more of (d) to (f) above.

In a further embodiment, the invention provides a method of preparing a shelf stable liquid nutritional composition, the method comprising
- a) providing a liquid composition having a pH of between 4 and 6 and comprising about 2% to about 25% by weight of non-hydrolysed, heat-denaturable whey protein wherein at least 55% of the whey protein is denatured,
- b) heat-treating the liquid composition to provide sterility,
- c) recovering the liquid composition wherein the liquid composition has
- d) a viscosity of less than 200 cP when measured at 20° C. and shear rate of 100 s−1, or
- e) an average particle size of less than 20 μm as categorised by the volume weighted average particle size parameter D[4,3], or
- f) exhibits essentially no observable gelation or aggregation, or
- g) any combination of two or more of (d) to (f) above.

Exemplary heat treatments include heat treatment at least equivalent to 121° C. for 10 minutes, including for example heat treatment at least equivalent to 140° C. for 5 s.

In a further aspect the invention provides a powdered nutritional composition dispersible in water to form a liquid nutritional composition of the invention.

In one embodiment the invention provides a powdered nutritional composition dispersible in water to form a liquid nutritional composition comprising
- a) from about 2% to about 25% by weight of non-hydrolysed whey protein that has been heated to at least 70° C. or wherein at least about 55% of the heat-denaturable protein is denatured;
- b) from 0 to about 30% by weight fat;
- c) from about 0% to about 45% by weight carbohydrate.

The invention also relates to a method of providing nutrition to a person in need thereof, the method comprising the steps of administering to the person a nutritional composition of the present invention.

The invention further relates to a food or food product comprising, consisting essentially of, or consisting of a liquid nutritional composition of the present invention. Foods or food products of the invention for providing nutrition to a person in need thereof are specifically contemplated, as is the use of compositions of the invention as described herein in the preparation of a medicament for use in any of the treatment methods described herein.

The following embodiments may relate to any of the aspects of the invention described herein.

In various embodiments, the liquid nutritional composition has, for example when undergoing the heat treatment, a pH of between about 4.0 to about 6.0, or a) a pH of between about 4.5 to about 6.0, or
b) a pH of between about 4.7 to about 6.0, or
c) a pH of between about 4.8 to about 6.0, or
d) a pH of between about 4.9 to about 6.0, or
e) a pH of between about 5.0 to about 6.0, or
f) a pH of between about 4.5 to about 5.7, or
g) a pH of between about 4.5 to about 5.5, or
h) a pH of between about 4.5 to about 5.3, or
i) a pH of between about 4.5 to about 5.2, or
j) a pH of between about 4.7 to about 5.5, or
k) a pH of between about 4.7 to about 5.3, or
l) a pH of between about 4.7 to about 5.2, or
m) a pH of between about 4.8 to about 5.3, or
n) a pH of between about 4.8 to about 5.2, or
o) a pH of about 5, or
p) a pH of between about 4.2 to about 5.8, or
q) a pH of between about 4.4 to about 5.8, or
r) a pH of between about 4.6 to about 5.6, or
s) a pH of between about 4.8 to about 5.4, or
t) a pH of between about 4.9 to about 5.3, or
u) a pH of between about 5.0 to about 5.2, or
v) a pH of about 5.1, or
w) a pH of between about 4.3 to about 5.1, or
x) a pH of between about 4.6 to about 5.1, or
y) a pH of between about 4.8 to about 5.1, or
z) a pH of between about 5.1 to about 6.0, or
aa) a pH of between about 5.1 to about 5.8, or
bb) a pH of between about 5.1 to about 5.6, or
cc) a pH of between about 5.1 to about 5.4.

In certain embodiments, the nutritional composition has, for example when undergoing the heat treatment,
a) a pH of within about 1 of the average pI of the protein present, or
b) a pH of within about 0.5 of the average pI of the protein present, or
c) a pH of within about 0.3 of the average pI of the protein present, or
d) a pH of within about 0.1 of the average pI of the protein present, or
e) a pH at about the average pI of the protein present.

In various embodiments, for example of the methods of the invention, the heat treatment is at a pH of within about 1 of the average pI of the protein present, for example, within about 0.5 of the average pI of the whey protein present. In other embodiments, the heat treatment is at a pH of within about 0.3 of the average pI of protein, or at a pH of within about 0.1 of the average pI of protein, or is at a pH at about the average pI of protein.

In various embodiments, the liquid nutritional composition of the invention has a viscosity of less than 200 cP when measured at 20° C. and shear rate of 100 s$^{-1}$ after having undergone a heat treatment with an $F_o$-value of at least equivalent to 90° C. for 40 s, or at least equivalent to 100° C. for 15 s. In one example, the liquid nutritional composition has a viscosity of less than 150 cP when measured at 20° C. and shear rate of 100 s$^{-1}$ and no discernable change in particle size after having undergone a heat treatment with an $F_o$-value of at least equivalent to 121° C. for 10 minutes. This provides an easily drinkable product with no sedimentation and creaming.

In various embodiments, the liquid nutritional composition has a viscosity of less than 200 cP when measured at 20° C. and shear rate of 100 s$^{-1}$ after having undergone a heat treatment of at least equivalent to 121° C. for 10 minutes. In one example, the liquid nutritional composition has a viscosity of less than 200 cP when measured at 20° C. and shear rate of 100 s$^{-1}$ no discernable change in particle size after having undergone an ultra heat treatment (UHT) with an $F_o$-value of at least equivalent to 140° C. for 5 s. This provides an easily drinkable product with no sedimentation and creaming.

In various embodiments, the liquid nutritional composition has a viscosity of less than 150 cP, or less than 100 cP, or less than 50 cP or less than 25 cP when measured at 20° C. and shear rate of 100 s$^{-1}$ after having undergone a heat treatment when at a pH of from about 4 to about 6 with an $F_o$-value of at least equivalent to 90° C. for 40 s, or preferably at least equivalent to 121° C. for 10 minutes or most preferably at least equivalent to 140° C. for 5 s.

In certain embodiments the protein present in the whey protein source, for example a whey protein concentrate (WPC), a whey protein isolate (WPI), or a blend of whey protein sources including a blend of WPCs or WPIs or both, comprises, consists essentially of, or consists of non-hydrolysed whey protein. In one exemplary embodiment, the protein present in the WPC or WPI comprises at least about 65% non-hydrolysed protein, at least about 70% non-hydrolysed protein, at least about 75% non-hydrolysed protein, at least about 80% non-hydrolysed protein, at least about 85% non-hydrolysed protein, at least about 90% non-hydrolysed protein, at least about 95% non-hydrolysed protein, or at least about 99% non-hydrolysed protein. In one embodiment, the WPC or WPI is essentially free of hydrolysed protein.

In one embodiment, the whey protein is provided by an ingredient that comprises a protein content of 35% to 95% by weight of the dry matter of the ingredient.

In certain embodiments, the denatured WPC comprises at least about 35% protein, at least about 50% protein, at least about 65% protein, at least about 70% protein, at least about 75% protein, or at least about 80% protein. In certain embodiments, higher protein content compositions are utilised, for example the denatured WPC or WPI comprises at least about 85% protein, at least about 90% protein, or at least about 95% protein.

In various embodiments, the whey protein comprises or is provided by an ingredient that comprises at least about 55% of the heat-denaturable protein present in a denatured state. In certain embodiments the whey protein comprises, consists essentially of, or consists of at least about 65% of the heat-denaturable protein present in a denatured state, at least about 70% of the heat-denaturable protein present in a denatured state, at least about 75% of the heat-denaturable protein present in a denatured state, at least about 80% of the heat-denaturable protein present in a denatured state, at least about 85% of the heat-denaturable protein present in a denatured state, at least about 90% of the heat-denaturable protein present in a denatured state, at least about 95% of the heat-denaturable protein present in a denatured state.

In one embodiment, the protein provides from about 10% to about 40% of the total energy content of the composition. In a further embodiment of the liquid composition, protein provides from about 10% to about 30% of the total energy content of the composition.

In some embodiments, the liquid composition is free of added stabilizers, is free of added emulsifiers, is free of added minerals, or is free of any combination of two or more of added stabilizers, added minerals, or added emulsifiers.

In one embodiment, the liquid nutritional composition has an energy density of from about 0.5 kcal/mL to about 3.5 kcal/mL In various embodiments, the liquid nutritional composition has an energy density of from about 0.6 kcal/ml to about 3.0 kcal/mL, from about 0.8 kcal/mL to about 3.0 kcal/mL, from about 1 kcal/mL to about 2.5 kcal, from about from about 1.5 kcal/mL to about 2.5 kcal, or about 2 kcal/mL In an exemplary embodiment of the liquid composition, the energy density is at least about 1 kcal/mL, at least about 1.5 kcal/mL, or at least about 2 kcal/mL.

In one embodiment, the liquid nutritional composition comprises of from about 10% w/w to about 25% w/w protein, or from about 10% w/w to about 20% w/w protein. In an exemplary embodiment of the liquid composition, the composition comprises from about 10% w/w to about 15% w/w protein or from about 10% w/w to about 14% w/w protein.

In one embodiment, the liquid nutritional composition comprises of from about 10% w/w to about 40% w/w carbohydrate. In an exemplary embodiment of the liquid composition, the composition comprises from about 10% w/w to about 35% w/w carbohydrate, from about 10% w/w to about 30% w/w carbohydrate, from about 15% w/w to about 35% w/w carbohydrate, or from about 15% w/w to about 30% w/w carbohydrate.

In one embodiment, the liquid nutritional composition comprises of from about 3% w/w to about 20% w/w fat. In an exemplary embodiment of the liquid composition, the composition comprises from about 5% w/w to about 20% w/w fat, from about 5% w/w to about 18% w/w fat, from about 5% w/w to about 16% w/w fat, or from about 5% w/w to about 15% w/w fat.

In certain embodiments, more than about 55% of the heat-denaturable protein present in liquid nutritional composition is denatured, or more than about 65% of the heat-denaturable protein present in liquid nutritional composition is denatured. In one example, more than about 70% of the heat-denaturable protein present in liquid nutritional composition is denatured, or more than about 75% of the heat-denaturable protein present in liquid nutritional composition is denatured. For example, in certain embodiments of the liquid nutritional composition of the invention, more than about 80%, more than about 85%, more than about 90%, more than about 95% of the heat-denaturable protein present in the composition is denatured.

In one embodiment the heat treated, substantially denatured whey protein, for example the WPC or WPI, suitable for use in this invention may be blended with at least one other protein source to produce a blend having at least 55% denaturation level. In certain embodiments the blend is a dry blend. Useful blends include blends of the heat treated, substantially denatured whey protein with, for example, whey protein concentrates (WPCs) or isolates (WPIs).

In certain embodiments, up to a further 10% hydrolysed protein can be added. In one example, less than about 8% hydrolysed protein, less than about 5% hydrolysed protein, less than about 2.5% hydrolysed protein, or less than about 1% hydrolysed protein is added. For example, in certain embodiments of the liquid nutritional composition of the invention, less than about 10%, less than about 8%, less than about 5%, less than about 2.5%, or less than about 1% hydrolysed protein is present in the liquid nutritional composition. As will be appreciated, in certain embodiments the use of 100% by weight of the heat-treated or substantially denatured protein is particularly advantageous, for example it allows a single easy to handle protein source to be used.

In one embodiment, the method of preparing a liquid nutritional composition comprises
a) providing non-hydrolysed, heat-denaturable whey protein wherein at least 55% of the whey protein is pre-denatured,
b) admixing the whey protein with a liquid, for example water or water additionally comprising an anti-foaming agent (optionally),
c) optionally admixing one or more ingredients selected from the group comprising stabilizers, minerals, trace elements, surfactants, or oils,
d) homogenising the admixture,
e) adjusting the pH of the liquid admixture to between about 4 to 6,
f) heat-treating the liquid composition to provide microbial control with a heat treatment having an $F_o$-value of at least equivalent to 90° C. for 40 s, for example at least equivalent to 121° C. for 10 minutes, including for example at least equivalent to 140° C. for 5 s,
g) recovering the liquid composition, wherein the nutritional composition stays in the liquid form in which no gelation or aggregation is observed after having undergone the heat treatment and the liquid composition has a viscosity of less than 200 cP when measured at 20° C. and shear rate of 100 $s^{-1}$ and has no discernable change in the particle size.

In various embodiments, the liquid is heated to about 50° C. or more prior to admixing with the whey protein.

In various embodiments, when added the one or more ingredients admixed in step (c) are heated prior to admixing, for example to at least 50° C., or to at least 60° C., or to at least 70° C., or to at least 80° C., or more.

In various embodiments, when performed the homogenisation is performed at about 50° C., or at about 60° C., or more.

In various embodiments, a post homogenisation step can be performed after the heat treatment.

In one embodiment, the method of preparing a liquid nutritional composition is essentially as herein described, for example with reference to FIG. 1.

In various embodiments, the person in need of nutrition may be suffering from or predisposed to a disease or condition, or may be being or have been treated for a disease or condition, is an elderly person, a person that is recovering from a disease or condition, or a person that is malnourished. In other embodiments, the person may also be a healthy person, such as a sportsman or active elderly, including persons having particular nutritional requirements.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE INVENTION

Figure 1:
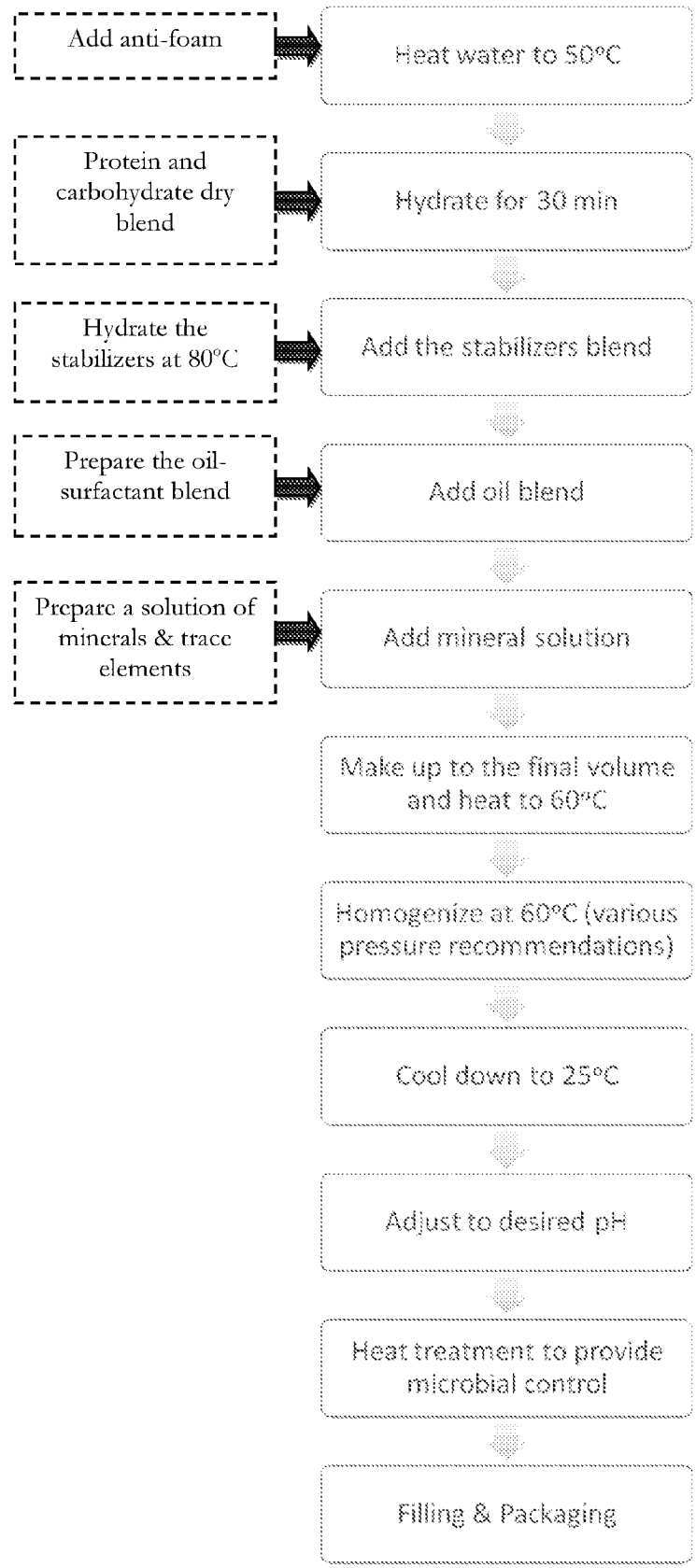
FIG. 1 shows the process flow for manufacture of liquid nutritional composition of the invention.

One of the major problems previously encountered in the production of high protein nutritional liquid compositions is the limited processability and heat-sensitivity of the protein component, and thus of the liquid composition as a whole. The heat treatment given to nutritional composition to provide microbial control, meaning that the protein is heated above its denaturation temperature results in protein denaturation and polymerizing into aggregates or gels. As a consequence, previous heat-treated liquid compositions exhibit unwanted sensorial attributes like chalkiness, sandiness, lumpiness, and high viscosity. Shelf life of such products has been limited in that sediment and/or cream layers are formed soon after production. High temperature processing can also lead to the generation of sulphurous off-flavours in nutritional liquid compositions. In compositions with a high protein content, in particular high whey protein content, these problems are exacerbated, leading to products with unwanted aggregates, and a risk of extensive fouling and blocking of production plant, such as UHT heating equipment.

The nutritional liquid compositions used in the present invention, in contrast, have good sensorial attributes and processability properties that are particularly suited to application in high protein medical foods and liquid nutritional compositions.

The present invention provides high protein liquid nutritional compositions, including nutritional liquids having good heat stability, good shelf stability, and low viscosity, at a pH in the range of about 4.0 to about 6.0 and optionally in the presence of substantial amounts of monovalent and divalent cations.

The term "liquid nutritional composition" refers to an aqueous composition to be administered by mouth or by other means, generally by tube feeding, to the stomach or intestines of a patient. Such other means include naso-gastric feeding, gastric feeding, jejunal feeding, naso-duodenal and naso-jejunal feeding, and duodenal feeding. Liquid nutritional compositions include "medical foods", "enteral nutrition", "food for special medical purposes", liquid meal replacers and supplements. The liquid nutritional compositions of the present invention provide significant amounts of protein and carbohydrate and usually also fat. They may also include vitamins and minerals. In exemplary embodiments they provide balanced meals.

The invention provides high protein liquid nutritional compositions having good thermal stability, particularly at pHs at or approaching the pI of the protein present in the composition. The exemplary WPC ingredients employed in representative examples of the liquid nutritional composition can be applied advantageously wherein the heat-treated or at least substantially denatured WPC confers the surprising benefits of stability under high temperatures at pH of 4 to 6. It would be reasonable to expect non-thermal denaturation methods found in the prior art can lead to similar effect. The denatured WPC ingredient is especially useful in that it provides good thermal stability and low viscosity to medical, orally or enterally administered foods because the liquid nutritional composition can be delivered readily by flow through a tube or by mouth.

Good thermal (heat) stability, when used herein with reference to liquid nutritional compositions, contemplates compositions retaining a liquid state of low viscosity, including for example liquid compositions in which essentially no gelation, or aggregation is observed, either directly after heat treatment or after prolonged storage at temperatures of about 20° C., e.g. at least 3 months, or preferably at least 6 months or 12 months. Small particle size, or little or no apparent increase in particle size on heating, are other indicia of a heat stable liquid nutritional composition, such as a liquid nutritional composition of the invention.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

As used herein, "non-hydrolysed" when used with reference to a protein-containing compositions, such as a liquid nutritional composition, powder, WPC, WPI or the like, means less than 2% of the protein present in the composition has undergone hydrolysis, and in certain embodiments less than 1% of the protein present in the composition has undergone hydrolysis.

For the purpose of the present specification, viscosity is measured at 20° C. using a rheometer such as an Anton Paar instrument using a cup and bob assembly at a shear rate of 100 $s^{-1}$, unless otherwise indicated. It will be appreciated that other methods to measure or estimate viscosity are well known in the art and may be employed where appropriate.

For the purpose of the present specification, energy densities are measured by calculation using standard calorific values of food constituents. Again, it will be appreciated that other methods to measure or estimate energy density, such as calorimetry, are well known in the art and may be employed where appropriate.

For the purpose of the present specification, mean particle size (characterised by D[4,3] or D[3,2]) is measured using a Malvern Mastersizer 2000 (Malvern Instruments Ltd, Worcs, UK) with a refractive index for the particles of 1.46 for emulsion based beverages and 1.52 for powders in suspension, and for the solvent of 1.33.

For the purpose of the present specification, primary aggregate size of reconstituted powders is determined by homogenising (150/50 bar) 10% total solids (TS) suspension at natural pH and determining the mean particle size (characterised by D[4,3]) using a Malvern Mastersizer 2000 (Malvern Instruments Ltd, Worcs, UK) with a refractive index for the particles of 1.52 and for the solvent of 1.33 as described above.

Primary aggregate growth after heating is determined by taking the 10% TS protein suspension and heating in an autoclave at 120° C. for 15 minutes and measuring D[4,3] as described above.

Methods for assessing protein concentrations are well-known in the art, for example as measured protein nitrogen by the Kjeldahl method. This method is based on nitrogen determination and protein concentration is calculated by multiplying the total nitrogen result by a conversion factor of 6.38 for dairy proteins.

Methods to determine the degree of protein denaturation are well known in the art. One exemplary method used herein relies on HPLC (Elgar et al (2000) J Chromatography A, 878, 183-196); and other methods suitable for use include methods reliant on an Agilent 2100 Bioanalyzer (Agilent Technologies, Inc. 2000, 2001-2007, Waldbronn, Germany) and microfluidic chips, and utilising Agilent 2100 Expert software (e.g. Anema, (2009) International Dairy J, 19, 198-204), and polyacrylamide gel electrophoresis (e.g. Patel et al, (2007) Le Lait, 87, 251-268).

Powders may be characterised by measuring the residual denaturable protein as a proportion of total protein (TN×6.38) according to the following formula:

$$\% \text{ Residual denaturable protein} = \frac{(\text{soluble denaturable protein}) \times 100}{(\text{Total Nitrogen} \times 6.38)}$$

where the soluble whey protein is determined using reversed phase HPLC (Elgar et al., 2000) as described above and is expressed as grams protein/100 grams powder.

The denaturable whey protein is measured as Σ(bovine serum albumin+α-lactalbumin+β-lactoglobulin+lactoferrin+immunoglobulins).

For a cheese WPC80 that has been carefully manufactured, the sum of the above components would typically be 60-63% of the TN and so the proportion of denaturable protein that has been denatured can be estimated according to the following formula:

$$1 - \frac{(\text{residual denaturable protein})}{61} \times 100$$

Liquid nutritional foods are often calorifically dense in that they contain nutrients such as fat, protein and carbohydrates in levels and combinations to attain calorific values of at least 0.5 kcal/g or of at least 0.5 kcal/mL In the group of medical or enteric foods calorific densities up to 3 kcal/g or even above are known. Such high calorific densities are difficult to achieve with high concentrations of whey protein without having any adverse effect of heating i.e. gelling or fouling In certain embodiments of the invention, the liquid nutritional composition comprises 5-20% protein, for example 5-15%. In certain embodiments the liquid nutritional composition comprises 4-25% protein, for example 4-20% of the heat-treated or substantially denatured WPC.

In certain embodiments of the invention, the fat content is 1-30% by weight, for example 5-20%, or between 5% and 15%. For example in exemplary low fat embodiments of the liquid nutritional composition, the fat content is 0% by weight to about 15% by weight, or from 0% by weight to about 10% by weight, or 0% to about 5% by weight. In other exemplary embodiments, for example higher fat compositions, the fat content is from about 15% by weight to about 35% by weight.

In certain embodiments of the invention, the carbohydrate content is 0-45%, for example 10-35%, or 20-30%. For example in exemplary low carbohydrate embodiments of the liquid nutritional composition, the carbohydrate content is 0% by weight to about 15% by weight, or from 0% by weight to about 10% by weight, or 0% to about 5% by weight. In other exemplary embodiments, for example higher carbohydrate compositions, the carbohydrate content is from about 15% by weight to about 35% by weight.

The formulation of the liquid nutritional food may also contain a wide variety of vitamins and minerals required to sustain patients nutritionally for long periods of time, and minor components such as antioxidants, flavouring and colouring. The amounts of vitamins and minerals to be used in certain embodiments are those typical of meal replacement products known to those skilled in the art. The micro-nutritional requirements of various sub-groups of the population are also known. The recommended daily requirements of vitamins and minerals can be specified for various population subgroups. See for instance, Dietary Reference Intakes: RDA and AI for vitamins and elements, United States National Academy of Sciences, Institute of Medicine, Food and Nutrition Board (2010) tables recommended intakes for infants 0-6, 6-12 months, children 1-3, and 4-8 years, adults males (6 age classes), females (6 age classes), pregnant (3 age classes) and lactating (3 age classes). Concentrations of essential nutrients in the liquid nutritional composition can be tailored in the exemplary serve size for a particular subgroup or medical condition or application so that the nutrition and ease of delivery requirements can be met simultaneously.

For instance, the level of added minerals can be selected based on European Commission guideline on Food for Special Medical Purposes (FSMP) directive, which specifies the following values of minerals per 100 kcal of a nutritional composition; 0 to 175 mg sodium; 80 to 295 mg potassium; 30 to 175 mg chloride; 35 to 175 mg calcium; 30 to 80 mg phosphorus; 7.5 to 25 mg magnesium; 0.5 to 2.0 mg iron; 0.5 to 1.5 mg zinc; 60 to 500 µg copper; 6.5 to 35 µg iodine; 2.5 to 10 µg selenium; 0.05 to 0.5 mg manganese; 1.25 to 15 µg chromium; 3.5 to 18 µg molybdenum; and less than 0.2 mg fluoride. One can choose to add higher levels for specific nutritional reasons. Examples of compositions of the invention having very good heat stability at pH from about 4 to 6 in the presence of various amounts of minerals, including those having very good heat stability despite high levels of minerals, are presented herein.

Typically the dried non-fat ingredients are dispersed in water, allowed to hydrate, mixed and then mixed vigorously with fat. In one embodiment the sugar (carbohydrate) and protein are mixed to assist in protein dispersion and solubilisation. Whilst protein and sugar (carbohydrate) mixes are the exemplary method of dispersion and solubilisation, protein and fat mixes can also be used for improved dispersion and solubilisation.

The components of the composition of the invention are typically homogenised to reduce the fat/oil droplet size and form an oil-in-water emulsion, and then heat treated.

The homogenization step used to form a stabilised food composition involves application of shear forces to reduce droplet or particle size. For some embodiments high shear stirring, for example, in a blade mixer (for example an Ultra Turrax or Waring blender) may be used. In certain embodiments the recombined base of liquid nutritional composition has an average particle size of less than 20 µm as categorised by the volume weighted average particle size parameter D[4,3], for example less than 10 even for example less than 2 or in certain embodiments less than 1 µm.

In one embodiment, homogenisation of the nutritional composition is carried out prior to the final heat treatment, or may be conducted as part of the heat treatment, including for example during an initial, partial, pre-heating, or post-heating step. In certain embodiments, for example of the liquid nutritional composition, the composition has after heating, and optionally after blending or homogenisation, a mean volume weighted particle size, D[4,3], of from about 0.3 µm to about 2 µm, or from about 0.5 µm to about 1.5 µm. For example, the composition has a mean particle size of about 1 µm.

In various exemplary embodiments, the liquid composition has a mean particle size that does not substantially increase when heated, for example, when heated with a heat treatment with an $F_o$-value of at least equivalent to 90° C. for 40 s, for example when heated at greater than 140° C. for 5 s. For example, the composition has a mean particle size that does not increase by more than 4-fold when heated at greater than 140° C. for 5 s, in certain examples does not increase by more than 3-fold, by more than 2-fold, when heated with a heat treatment with an $F_o$-value of at least equivalent to 140° C. for 5 s.

In one exemplary embodiment, the liquid composition has a mean particle size that does not increase when heated with an $F_o$-value of at least equivalent to 90° C. for 40 s.

Exemplary methods for preparing WPCs suitable for use in the present invention are provided in PCT International Application PCT/NZ2007/000059 (published as WO 2007/108709) and PCT/NZ2010/000072 (published as WO 2010/120199 incorporated by reference herein in its entirety).

The protein, for example the WPC or WPI, ingredient may be prepared from a mixture of WPCs, or from a mixture of proteins. In certain embodiments the protein is or comprises whey protein. In various embodiments, the protein is or comprises a whey protein concentrate (WPC) or whey protein isolate (WPI).

Heat treatment is applied in the preparation of the protein, such as the WPC, to impart the required denaturation and to ensure it is suspendable. Whey protein comprises high levels of globular proteins that are sensitive to aggregation in the denatured state. The denaturation temperature of β-lactoglobulin is pH-dependent, and at pH 6.7 irreversible denaturation occurs when the protein is heated above 65° C. This denaturation is believed to expose a free thiol group, which is reported to initiate inter-protein disulfide bond formation leading to polymerization resulting in aggregate formation. Other disulfide bridges and cysteine residues are thought to play a role in the polymerization reaction. α-lactalbumin also has a denaturation temperature of about 65° C.

The size, shape and density of the protein aggregates are influenced by a number of environmental and processing parameters including temperature, heating rate, pressure, shear, pH and ionic strength. Depending on the combination of these parameters, the aggregates may form a gel, fibrils or compact micro-particles. For example microparticulated whey can be formed under specific ionic strength and shear conditions. These particles have a compact structure, a low intrinsic viscosity and a low specific volume. Further, it is known that a relationship exists between aggregates size and heating temperature for microparticulated whey produced under shear conditions.

In certain embodiments, the whey protein ingredient is made according to a process as specified according to U.S. Pat. No. 6,767,575 (Huss & Spiegel), US2006/0204643 (Merrill et al), U.S. Pat. No. 4,734,827 (Singer et al), U.S. Pat. No. 5,494,696 (Hoist et al), PCT/NZ2010/000072 (published as WO 2010/120199), EP0412590 and EP0347237 (Unilever) or Robinson et al (1976) NZ J Dairy Science & Technology, 11, 114-126. Each method of making a whey protein ingredient would impart different properties so anyone using this invention should select the protein ingredient to best suit their process.

The liquid nutritional composition is subjected to heat treatment after it has been prepared, primarily to increase shelf life of the product and minimise the potential for growth of food spoilage and pathogenic microorganisms.

As will be appreciated by those skilled in the art, the lethal effect of high temperatures on microorganisms is dependent on both temperature and holding time, and the reduction in time required to kill the same number of microorganisms as temperature is increased is well known. The time taken to reduce initial microbial numbers, at a specified temperature, by a particular amount, is commonly referred to as a "F value", As described in Mullan, W. M. A. (2007) (Mullan, W. M. A., Calculator for determining the F value of a thermal process. Available on-line from Dairy Science and Food Technology) and references therein, the F value of a thermal process can be calculated by plotting lethal rates against process time, where lethal rate can be calculated using the following equation (Stobo, 1973):

$$\text{Lethal rate} = 10^{(T-Tr)/z}$$

where T is the temperature at which the lethal rate is calculated, Tr is the reference temperature at which the equivalent lethal effect is compared, and z is the reciprocal of the slope of the thermal death curve for the target microorganism or spore (all values in degrees Celsius). As Mullan asserts, a z value of 10° C. is frequently used in $F_o$ calculations performed on low acid foods.

F values can thus be used to describe the thermal input into a particular process. As discussed herein, the liquid nutritional compositions of the present invention are typically subjected to a heat treatment step having an $F_o$-value of at least equivalent to 90° C. for 40 s, whilst exhibiting useful heat stability, such as not forming a gel.

Various heat treatments of the liquid nutritional composition may be used. Ultra-high temperature (UHT) treatment is exemplary. Typical UHT conditions are 140 to 150° C. for 2 to 18 seconds, but longer durations are possible, for example 10 seconds, 15 seconds, 20 seconds, or more. Another process used to ensure sterility is retort heat treatment—often 120-130° C. for 10 to 20 minutes. Examples of such heat treatments can have $F_0$ values well in excess of the minimum threshold.

Other combinations of equivalent heat treatment are known and are applicable to the present invention given appropriate adherence to the requirements of microbial stability and sterility. Other known art non-thermal processes can be used in combination with heat treatment to inhibit microbiological activity in the liquid nutritional composition. One skilled in the art can calculate the equivalent heat treatment time at a different temperature by using the z value, as demonstrated in the table below

| | Temperature (° C.) | | | |
| --- | --- | --- | --- | --- |
| | 90 | 140 | 148 | 121 |
| | Time (s) | | | |
| | 40 | 5 | 6.9 | 600 |
| Reference Temp (° C.) | Equivalent time (s) at Reference Temp | | | |
| 80 | 400 | 5000000 | 43536057 | 7553552 |
| 90 | 40 | 500000 | 4353606 | 755355 |
| 92 | 25 | 315479 | 2746939 | 476597 |
| 121 | 0.032 | 397 | 3458 | 600 |
| 140 | 0.00040 | 5 | 44 | 7.6 |

Heat stability of the liquid composition includes having no gelation, or aggregation either directly after heat treatment or after prolonged storage at temperatures of about 20° C., e.g. at least 3 months or preferably at least 6 months or 12 months.

Gelation of a liquid nutritional composition is considered to be a change in state from a liquid to a soft to firm solid. Gelation can be assessed visually and by touch. If the solution no longer flows following heating, it is considered to have gelled.

To attain the required sterility while maintaining liquidity, the proteins must be stable to the heat treatment conditions. The nutritional composition has been found to be surprisingly stable to the required heat treatments in the pH range 4 to 6.

An exemplary method for assessing the heat stability of milk is well known in the art. The method of heat coagulation time (HCT) involves sealing a milk sample (1-2 mL) in a glass tube which is clipped onto a platform and placed in a silicone oil bath thermostatically controlled at 140° C. with a defined rocking rate. The length of time that elapses between placing the container in the oil bath and onset of visible aggregates formation is defined as the HCT (Singh H & Creamer L K (1992), Determination of heat stability, In: Advanced Dairy Chemistry e.d. Fox PF Elsevier). Applicants believe, without wishing to be bound by any theory and based on their experience including that described herein, any liquid nutritional composition having a heat coagulation time of less than 65 s has a high risk of extensive fouling and blocking of UHT heating equipment, while any liquid composition with 65-80 s HCT has a potential risk of fouling. As described herein, liquid nutritional compositions having heat coagulation time of higher than 80 s is stable to UHT heating treatment at 140° C. for 5 s.

In one embodiment, an exemplary liquid composition prepared with a native WPC (392) having a pH of between about 4 and about 6 has an average coagulation time of 40 s. In the same embodiment, exemplary liquid compositions of the invention prepared with a non-hydrolysed whey protein wherein at least about 55% of the heat-denaturable protein is denatured and having a pH of between about 4 and about 6 has an average coagulation time of greater than about 180 s (≥4 times the control) when heated at 140° C. For example, the liquid compositions of the invention having a pH of between about 4 and about 6 has an average coagulation time of greater than about 400 s, greater than about 800 s, greater than about 16 min, greater than about 30 min when heated at 140° C., depending on the method of making the protein ingredient. One skilled in the art should appreciate that any of these heat stability improvements greatly increases the ease of processing.

In one embodiment, an exemplary the liquid composition of the invention has an average coagulation time of greater than about 150 s when heated at 140° C. at a pH within 0.5 of the average isoelectric point (pI) of the protein present in the composition. For example, the liquid composition has an average coagulation time of greater than about 170 s, greater than about 200 s, greater than about 300 s, greater than about 330 s, greater than about 360 s, or greater than about 400 s when heated at 140° C. within 0.5 of the average pI of the protein present in the composition. In the same embodiment, the liquid composition has an average coagulation time of less than about 80 s when heated at 140° C. at a pH greater than 6.0.

In certain embodiments, the heat-treated, substantially denatured whey protein, for example the WPC or WPI, is dried and then rehydrated in the composition or in an aqueous component of it. In certain embodiments, the heat-treated, substantially denatured WPC has at least 35%, at least 55% (on a moisture and fat-free basis), for example at least 70% protein and in certain embodiments at least 80% protein.

The heat treated, substantially denatured liquid WPCs (without drying) may also be used with the same protein concentration characteristics as defined for the dried ingredient.

The heat-treated, substantially denatured WPC, or the liquid nutritional composition, may be treated with an enzyme to further reduce the lactose concentration e.g. by a beta-galactosidase-treatment.

In certain embodiments the heat treated, substantially denatured whey protein, for example the WPC or WPI, is dried to a moisture content of less than 5%, or a water activity level that facilitates storage of the dry ingredient for several months without undue deterioration.

Exemplary proteins for use in the invention include whey proteins, such as whey protein concentrates and whey protein isolates. Whey protein is recognised as a complete protein known for its excellent amino acid profile which provides all of the essential amino acids, high cysteine content, high leucine content, ease of digestion, and for providing proteins associated with bioactivity, such as lactoglobulins, immunoglobulins, and lactoferrin.

WPC is rich in whey proteins, but also contains other components such as fat, lactose, and, in the case of cheese whey-based WPCs, glycomacropeptide (GMP), a casein-related non-globular protein that is non-denaturable. Typical methods of production of whey protein concentrate utilise membrane filtration, and alternative methods of production of WPC particularly suited to application in the present invention are described herein.

Accordingly, as used herein "WPC" is a fraction of whey from which lactose has been at least partially removed to increase the protein content to at least 20% (w/w). In certain embodiments, the WPC has at least 35%, at least 40%, at least 55% (w/w), at least 65%, and in certain embodiments at least 80% of the total solids (TS) as whey protein. In some examples, the proportions of the whey proteins are substantially unaltered relative to those of the whey from which the WPC is derived. In one embodiment, the WPC is an evaporated whey protein retentate. For the purposes of this specification, the term "WPC" includes WPIs when the context allows.

Particularly contemplated WPI include WPIs and WPCs having at least 90% of the TS of whey protein.

WPI consists primarily of whey proteins with negligible fat and lactose content. Accordingly, the preparation of WPI typically requires a more rigorous separation process such as a combination of micro filtration and ultra-filtration or ion exchange chromatography. It is generally recognised that a WPI refers to a composition in which at least 90 weight % of the solids are whey proteins.

Whey proteins may originate from any mammalian animal species, such as, for instance cows, sheep, goats, horses, buffalos, and camels. Preferably, the whey protein is bovine.

In certain exemplary embodiments, the whey protein source is available as a powder, preferably the whey protein source is a WPC or WPI.

In certain embodiments, for example of the liquid nutritional composition, the heat-treated or denatured protein, for example the WPC, comprises less than 90% by weight protein. For example the heat-treated or denatured protein comprises at least 51% by weight protein, in certain embodiments at least 70%, in certain embodiments at least 80% protein, wherein at least 55% of the total denaturable protein is in denatured state.

Other protein that may be included in the liquid nutritional composition includes mixtures of milk proteins, in certain embodiments provided from a milk protein concentrate, casein, caseinate, or similar, provided that it does not impact on heat stability of the nutritional composition, wherein at least 50%, or in certain embodiments at least 80%, of total solids as protein.

In one example, the invention relates to a method of preparing a liquid nutritional composition, the method comprising
- a) providing an aqueous WPC or WPI solution having a protein concentration of 15-50% (w/v), at a pH of 4.7-8.5;
- b) heat treating the solution to more than 50° C., for a time that allows protein denaturation to occur; the heat treating comprising heating the solution while under conditions of turbulent flow, for example with a Reynolds number of at least 500;
- c) at the end of the heat treatment combining the heat treated WPC or WPI with other ingredients to provide a liquid composition having a pH of between 4 and 6 and comprising about 2% to about 25% by weight of protein from the heat treated WPC or WPI,
- d) heat treating the liquid composition with a heat treatment has an $F_o$-value of at least equivalent to 90° C. for 40 s, and
- e) recovering the liquid composition, wherein the liquid composition has
- f) a viscosity of less than 200 cP when measured at 20° C. and shear rate of 100 s−1, or
- g) an average particle size of less than 20 μm as categorised by the volume weighted average particle size parameter D[4,3], or
- h) exhibits essentially no observable gelation or aggregation.

The fat used may be vegetable fat or animal fat, including dairy fat and fish oils. Vegetable oils are often exemplary because of their ease of formulation and lower saturated fatty acid content.

Exemplary vegetable oils include canola (rapeseed) oil, corn oil, sunflower oil, olive or soybean oil.

The liquid nutritional composition typically will not require but may also include emulsifiers such as soya lecithin or phospholipids and the like in addition to the WPC.

The carbohydrate used typically comprises digestible carbohydrate as 75-100% of the carbohydrate. The carbohydrate may comprise monosaccharides, disaccharides, oligosaccharides and polysaccharides and mixtures thereof. Oligosaccharides of glucose are typically used. A number of these are commercially available as maltodextrin (3-20 DE) or corn syrup for the longer chain carbohydrates (>20 DE). Non-digestible carbohydrates may also be included, for example, fructooligosaccharides, inulin, and galactooligosaccharides. These are typically present in amounts of 0.2-5% of the composition. Fibre, including insoluble fibre, can also be included.

In exemplary embodiments the liquid nutritional composition is a nutritionally complete composition or a high energy liquid or powder for breakfast or other times of the day.

EXAMPLES

The following examples further illustrate practice of the invention.

Example 1

Heat Stability of Exemplary Liquid Nutritional Formulation Prepared with Whey Proteins at Varying Denaturation Levels This example demonstrates the heat stability of various exemplary liquid nutritional compositions prepared at pH 5.4, comprising substantially denatured whey protein to determine their suitability for use in formulations of the present invention.

Methods

The exemplary nutritional formulations were prepared according to Table 1 using denatured WPC powders (Powder A to I) or native whey (WPC 392) detailed in Table 2. The method of preparation of the nutritional formulations is described in FIG. 1. The pH of each formulation was adjusted to pH 5.4 prior to heating in oil bath at 90° C. The time of visual aggregation for each formulation at 90° C. was determined.

TABLE 1

Composition of exemplary liquid nutritional formulations

| Components | % wt |
|---|---|
| Protein powder* | varies |
| Corn oil | 2 |
| Sucrose | 4.2 |
| Maltodextrin | 6.3 |
| Lecithin | 0.1 |

*Protein powder was added to obtain 4% by weight protein in the final formulation

TABLE 2

Composition of denatured powders

| Name | Protein Content, % (TN x 6.38) | Residual Denaturable Protein % Total/TN x6.38 | % Denatured protein | Primary Aggregate Size of 10% TS Protein Solution D[4,3], μm | Aggregate Growth After Heating 10% TS Protein Solution D[4,3], μm | Description |
|---|---|---|---|---|---|---|
| WPC392 | 80.3 | 61 | 0-0.4 | — | Gel | Fonterra commercial WPC made by ultrafiltration of cheese whey |
| WPI895 | 93.8 | 95 | — | — | Gel | Fonterra commercial WPI made by ion exchange and ultrafiltration |
| Powder A | 79.1 | 15 | 75 | 1.70 | 1.72 | According to PCT/NZ2010/000072; published as WO2010/120199 |
| Powder B | 80.1 | 21 | 66 | 2.50 | 7.28 | According to PCT/NZ2010/000072; published as WO2010/120199 |
| Powder C | 80.0 | 28 | 54 | 1.62 | 2.77 | According to PCT/NZ2010/000072; published as WO2010/120199 |

TABLE 2-continued

Composition of denatured powders

| Name | Protein Content, % (TN x 6.38) | Residual Denaturable Protein % Total/TN x6.38 | % Denatured protein | Primary Aggregate Size of 10% TS Protein Solution D[4,3], μm | Aggregate Growth After Heating 10% TS Protein Solution D[4,3], μm | Description |
|---|---|---|---|---|---|---|
| Powder D | 80.0 | 18 | 70 | 2.37 | 5.11 | According to PCT/NZ2010/000072; published as WO2010/120199 |
| Powder E | 80.0 | 11 | 82 | 2.20 | 2.20 | According to PCT/NZ2010/000072; published as WO2010/120199 |
| Powder F | 80.0 | 8 | 87 | 2.13 | 2.20 | According to PCT/NZ2010/000072; published as WO2010/120199 |
| Powder G Lactalbumin | 89.3 | 1 | — | 10.80 | Curd | According to Robinson et al. 1976 |
| Powder H Simplesse ® | 53.0 | 19 | 69 | 1.01 | 2.20 | Supplied by CP Kelco; Microparticulated whey protein according to U.S. Pat. No. 4,734,287 |
| Powder I Microparticulated whey protein | 80.0 | 5 | 92 | 5.97 | n.d | Made using an APV Shear Agglomerator |
| Powder J | 27.6 | 28 | 46 | 1.63 | 31.10 | According to PCT/NZ2010/000072; published as WO2010/120199 |
| Powder K | 51.3 | 17 | 72 | 1.90 | 12.50 | According to PCT/NZ2010/000072; published as WO2010/120199 |
| Powder L | 66.7 | 14 | 77 | 2.19 | 2.33 | According to PCT/NZ2010/000072; published as WO2010/120199 |
| Powder M | 81.5 | 10 | 84 | 1.92 | 1.91 | According to PCT/NZ2010/000072; published as WO2010/120199 |

TABLE 3

Heat coagulation time of exemplary liquid nutritional formulations

| Powder | WPC 392 | A | B | C | D | E | F | G | H | I |
|---|---|---|---|---|---|---|---|---|---|---|
| Heat coagulation times | 40 s | >30 min | >30 min | 16 min | >30 min | >30 min | >30 min | 180 s | 400 s | 800 s |

Results

The formulations comprising denatured WPC (Powders A to F), showed superior heat stability compared with a native WPC (392) at pH 5.4 as shown in Table 3. The differences in heat stability for powders made using different manufacturing procedures demonstrates that producers have a wide choice of ingredients to use to make this invention work. One using this invention should select the protein ingredient to best suit their process.

These results show that the liquid nutritional formulations of the invention are heat stable following the heat treatment applied to control microbial growth at pH 4 to 6.

Example 2

Heat Stability of Exemplary Liquid Nutritional Formulation (10 g Protein/100 ml) across a Range of pH Values This example describes the preparation of exemplary heat stable liquid nutritional formulations comprising substantially denatured WPC, and an assessment of their heat stability across a range of pH values.

Methods

A liquid nutritional formulation of 1.6 kcal/mL, comprising 10% protein in the form of powder A was prepared as shown in Table 4, following the method of FIG. 1.

TABLE 4

Exemplary high protein liquid nutritional formulation

| | 10% protein % w/w |
|---|---|
| Water | 68.16 |
| Protein powder A | 11.7 |
| Sucrose | 5.75 |
| Maltodextrin Maltrin M180 | 8.44 |
| Tri-Sodium Citrate Di-Hydrate | 0.10 |
| Di-sodium Phosphate | 0.12 |
| Potassium Chloride | 0.17 |
| Magnesium Citrate | 0.12 |
| Tri-Calcium Phosphate | 0.19 |
| Seakem 614 (carrageenan) | 0.06 |
| Novagel GP2180 (microcrystalline cellulose) | 0.20 |
| Lecithin | 0.13 |
| Corn Oil | 5.00 |
| Antifoam | 0.005 |
| Total batch size | 100 |

The pH of the formulation was adjusted within the range of pH 5.1-7.1 and all samples underwent heating in an oil bath at 140° C., or heating in a retort at 121° C. for 10 minutes. The formulations at pH 5.1 and 6.8 also underwent heat treatment through UHT/Direct Steam Injection (DSI) unit at 140° C. for 5 seconds.

The heat coagulation times following heating in oil bath at 140° C. were recorded, and the retorted cans were visually assessed for the presence of aggregates, gel formation or lumps. The viscosity, particle size, creaming and sedimentation of the formulation at pH 5.1 and pH 6.8 were assessed as described herein immediately following UHT/DSI heat treatment at 140° C. for 5 seconds, and after 1 and 3 months storage at ambient temperature (20° C.) following UHT/DSI treatment. Sensory descriptive analysis of the organoleptic properties of the formulations was performed. Twelve panelists trained in descriptive analysis of these beverages, were presented with the chilled coded samples and instructed to score them for aroma and flavour attributes using a 150 point scale, where 1=absent and 150=intense.

Results

Figure 2:
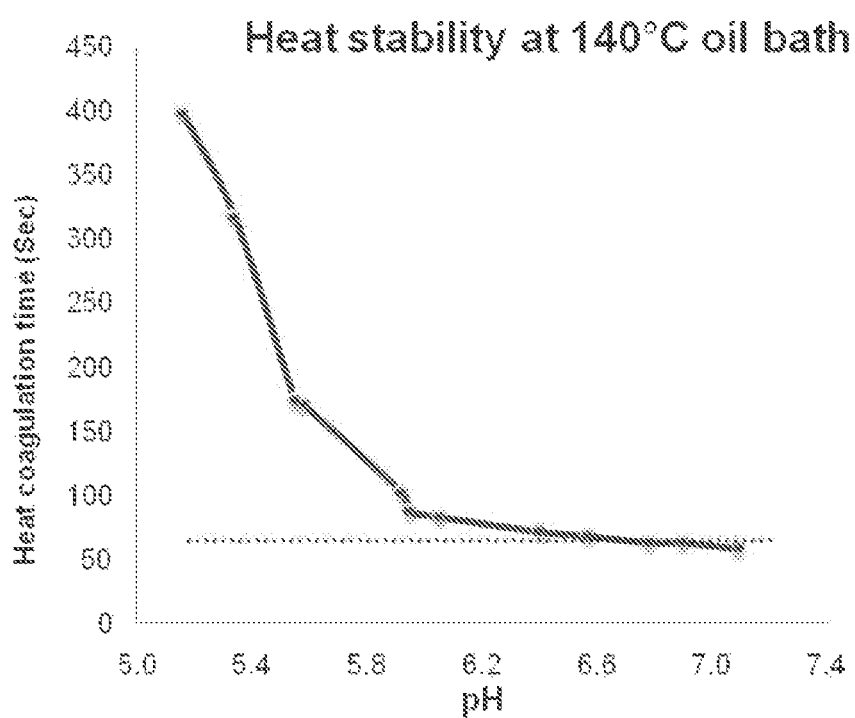
FIG. 2 shows the heat stability of an exemplary liquid formulation of the invention heated in an oil bath at 140° C. at a range of pH.
Figure 3:
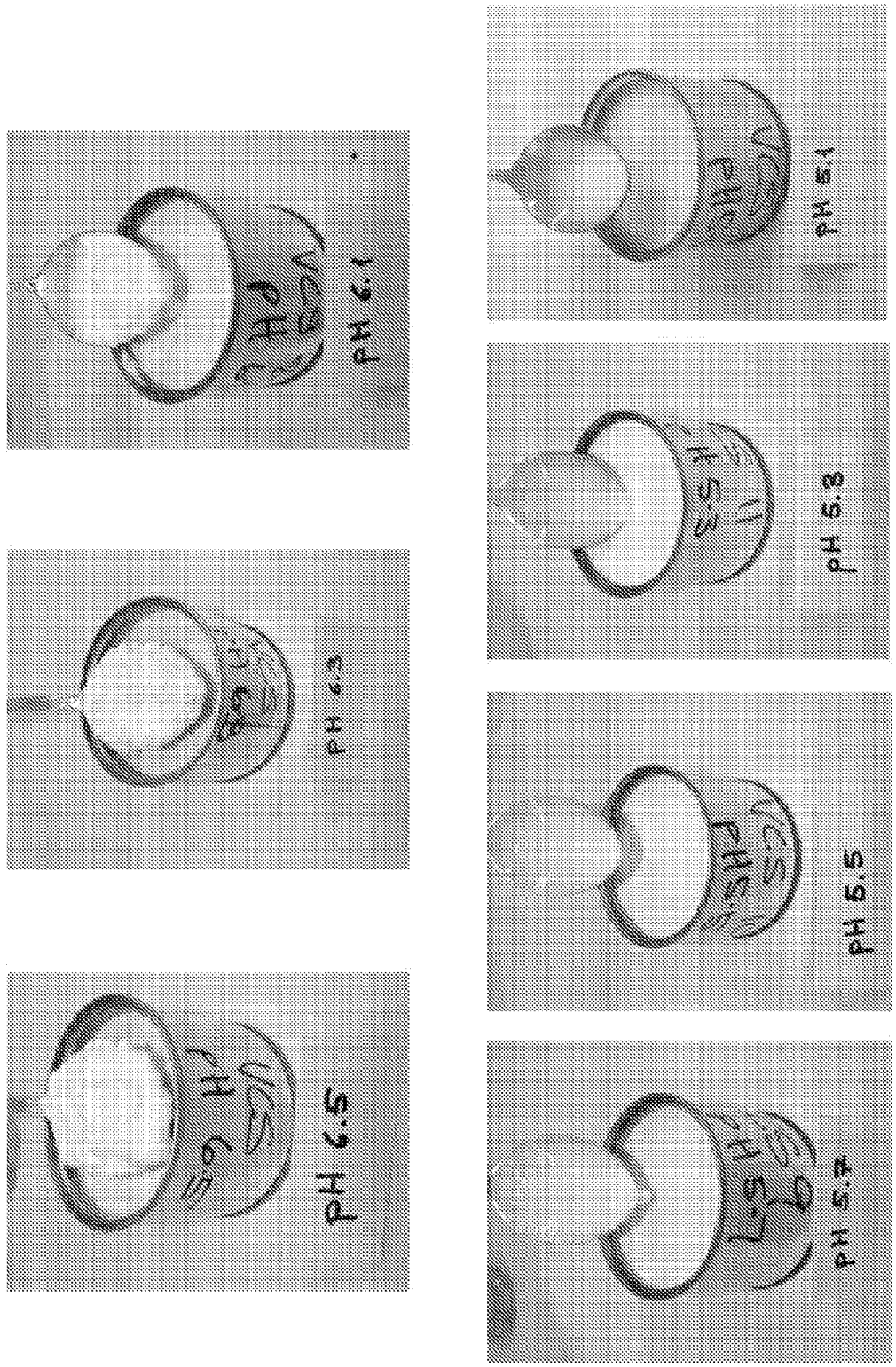
FIG. 3 depicts liquid nutritional formulations of the invention following retorting at a range of pH values.

The formulations showed increasing heat stability at decreasing pH. FIG. 2 shows that the heat coagulation time of the formulation was increased at lower pH, particularly in the range of pH 5.1-5.6. FIG. 3 shows that at lower pH, the formulation did not gel after retorting and remained a low viscosity liquid at a range of pH, particularly pH 5.1-5.7, while at pH>6.0 gel formation and lumps were observed.

Figure 4:
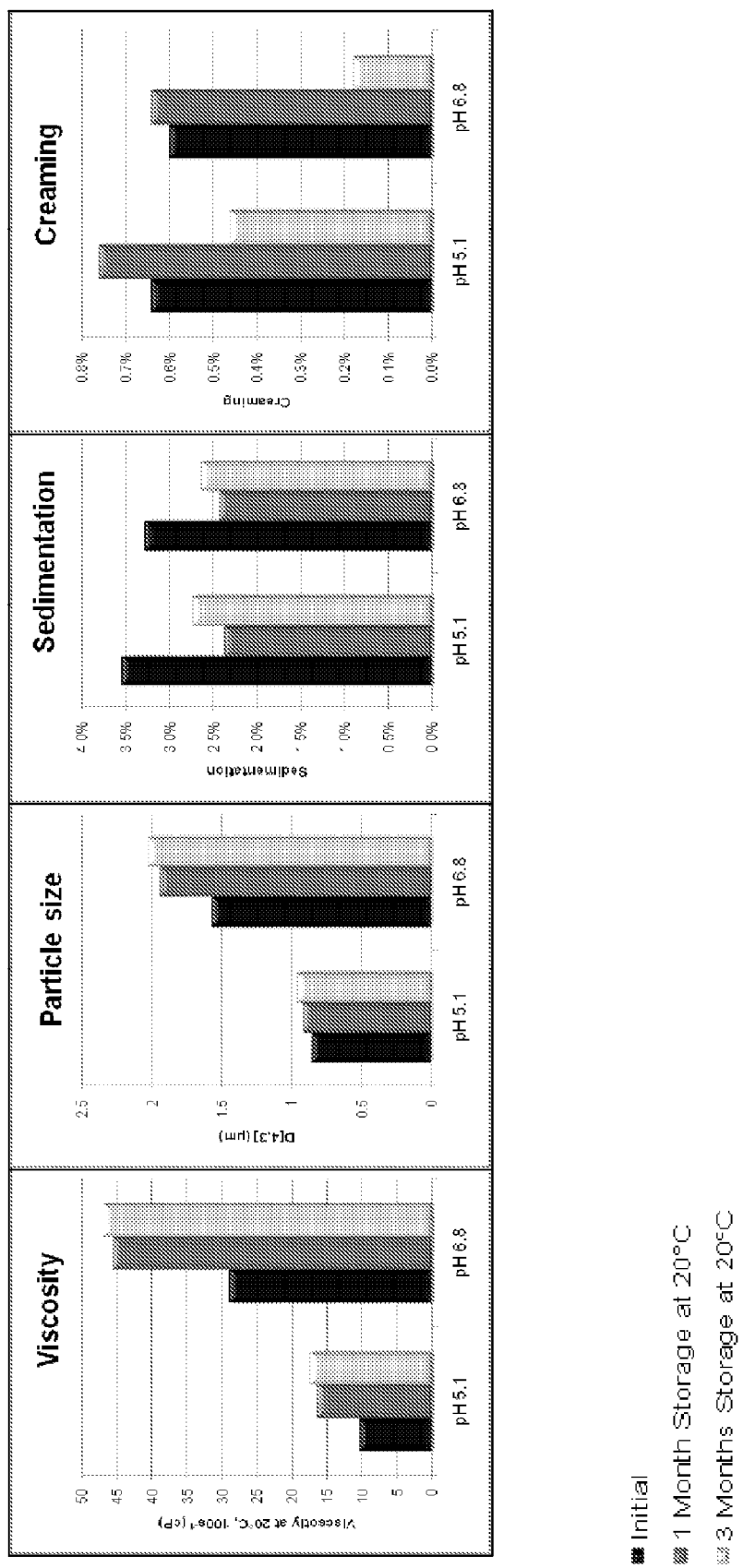
FIG. 4 shows the viscosity, volumetric mean particle size, creaming and sedimentation of liquid nutritional formulations of the invention immediately following UHT/Direct Steam Injection (DSI) heat treatment and after 6 weeks storage at ambient temperature following such heat treatment.

FIG. 4 shows that the viscosity and particle size of the formulation was reduced following the heat treatment applied to provide microbial control at pH 5.1 compared with pH 6.8. Table 5 shows that following heat treatment at pH 5.1, the formulation had reduced eggy aroma and taste, and increased sour taste compared with the formulation treated at pH 6.8. At pH 5.1, the formulation had a lower viscosity and was less powdery.

TABLE 5

Sensory descriptive analysis mean scores of exemplary high protein liquid nutritional formulations at pH 5.1 and pH 6.8

|  | pH 5.1 | pH 6.8 |
| --- | --- | --- |
| Eggy aroma | 39.1 | 55.3 |
| Creamy aroma | 30.3 | 30.6 |
| Cooked aroma | 27.6 | 29.6 |
| Cowy aroma | 15.1 | 15.00 |
| Cereal aroma | 8.9 | 11.00 |
| Sweet | 62.4 | 70.7 |
| Salt | 10.6 | 10.6 |
| Sour | 81.8 | 1.1 |
| Bitter | 0.04 | 0.04 |
| Eggy | 23.7 | 40.6 |
| Creamy | 31.9 | 34.8 |
| Cooked | 31.1 | 32.8 |
| Cowy | 13.4 | 14.4 |
| Cereal | 9.4 | 12.7 |
| Consistency | 62.9 | 76.1 |
| Powdery | 0.7 | 4.2 |
| Mouthcoating | 27.4 | 29.3 |

These results indicate that the liquid nutritional formulations of the invention are heat stable and exhibit favourable organoleptic properties following heat treatment at lower pH. This also provides the manufacturer of beverages with the ability to flavour products differently.

Example 3

Heat Stability of Exemplary Liquid Nutritional Formulation with Varying Protein Sources This example demonstrates the heat stability of liquid nutritional formulations comprising powder A at low pH, compared with other whey protein sources.

Methods

A liquid nutritional formulation at 1.6 kcal/mL was prepared comprising 10% protein in the form of Powder A, whey protein hydrolysate (WPH 7080), native whey (WPC 392) or whey protein isolate (WPI 895) on the basis of the recipe shown in Table 4. A flow chart of the method is shown in FIG. 1.

The pH of the formulations was adjusted to pH 5.0 prior to heat treatment applied to provide microbial control. All samples underwent heating in a rotary retort at 121° C. for 10 minutes. The retorted cans were visually assessed for the presence of aggregates, gel formation or lumps.

Results

Figure 5:
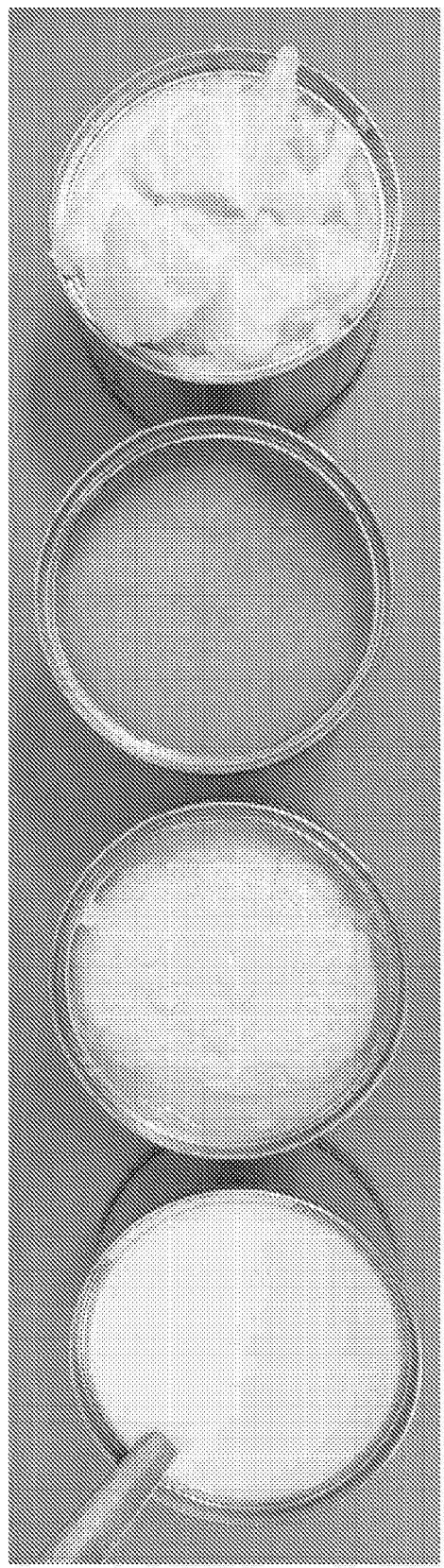
FIG. 5 depicts liquid nutritional formulations of the invention comprising different whey protein sources following heat treatment by retorting at 121° C. for 10 minutes at pH 5.0.

The formulation comprising powder A did not gel after heat treatment, whereas the formulations comprising native WPC and WPI gelled as shown in FIG. 5. The formulation comprising the whey protein hydrolysate did not gel, but showed severe phase separation of the oil phase, in addition to the excessive browning making such a product undesirable to consumers. This result indicates that the liquid nutritional formulations of the invention are heat stable and organoleptically favourable following heat treatment at pH 4-6.

Example 4

Robustness of Exemplary Liquid Nutritional Formulations to UHT Conditions

This example describes the preparation of an exemplary liquid nutritional formulation comprising powder A, and an assessment of its heat stability at pH 5.4 and pH 6.8 across a range of UHT conditions.

Methods

A liquid nutritional formulation at 1.6 kcal/mL was prepared comprising 10% protein in the form of Powder A on the basis of the recipe shown in Table 4. A flow chart of the process is shown in FIG. 1.

The pH of the formulation was adjusted to pH 5.4 or pH 6.8 prior to heat treatment applied to provide microbial control. The viscosity, particle size, creaming and sedimentation of the formulations were assessed following UHT/indirect steam injection treatment at a temperature in the range of 138-148° C. for a holding time in the range of 5-20 seconds and following subsequent homogenisation at 150/50 bar.

Results

At pH 6.8, the formulation was not stable at any heating conditions, including the at the lowest time/temperature conditions (138° C. for 5 seconds) and could not be processed at UHT/indirect because of extensive fouling and blocking of the UHT equipment. However, at pH 5.4, the formulation did not gel and sedimentation, creaming, viscosity and sedimentation remained favourable at all temperatures and all holding times as shown in Table 6. At pH range of 4.0-6.0, the liquid compositions are more robust to wider time/temperature heating conditions.

TABLE 6

Heat stability of exemplary high protein liquid nutritional formulation

| Holding times (sec) at a flow rate of 1 L/min | Temp ° C. (UHT/Indirect) | Product characteristics after processing | After UHT/Indirect treatment and post homogenization | | | |
|---|---|---|---|---|---|---|
| | | | Sedimentation % | Creaming % | Particle size D(4,3 μm) | Viscosity cP 100 s$^{-1}$ |
| 18.9 | 146.50 | Smooth | 4.52 | 0.14 | 0.90 | 15.87 |
| 18.9 | 139.50 | Smooth | 2.52 | 0.19 | 0.93 | 16.03 |
| 6.9 | 143.00 | Smooth | 2.78 | 0.32 | 0.88 | 17.13 |
| 6.9 | 138.00 | Smooth | 2.78 | 0.30 | 0.86 | 16.63 |
| 6.9 | 148.00 | Smooth | 3.12 | 0.30 | 0.90 | 16.86 |
| 8.9 | 139.50 | Smooth | 2.50 | 0.10 | 0.88 | 15.93 |
| 8.9 | 146.50 | Smooth | 2.36 | 0.22 | 0.88 | 15.86 |
| 13.9 | 138.00 | Smooth | 2.48 | 0.36 | 0.82 | 16.94 |
| 13.9 | 148.00 | Smooth | 2.60 | 0.28 | 0.85 | 17.19 |
| 13.9 | 143.00 | Smooth | 2.62 | 0.22 | 0.85 | 17.19 |
| 23.9 | 143.00 | Smooth | 3.00 | 0.40 | 0.82 | 15.83 |
| 23.9 | 138.00 | Smooth | 3.04 | 0.36 | 0.81 | 15.26 |
| 23.9 | 148.00 | Smooth | 3.20 | 0.40 | 0.88 | 16.23 |

This result indicates that the liquid nutritional formulations of the invention are heat stable following heat treatment at pH 4-6.

Example 5

Heat Stability of Exemplary Liquid Nutritional Formulation (13.8 g Protein/100 ml)

This example describes the preparation of an exemplary liquid nutritional formulation comprising powder A, and an assessment of its heat stability at pH 5.4 and pH 6.8 across a range of UHT conditions.

Methods

A liquid nutritional formulation at 2.4 kcal/mL was prepared comprising 13.8% protein in the form of powder A on the basis of the recipe shown in Table 7. A flow chart of the process is shown in FIG. 1.

TABLE 7

Exemplary high protein liquid nutritional formulation

| | 13.8% protein w/w |
|---|---|
| Water total | 58.4 |
| Protein powder A | 15.7 |
| Sucrose | 8.8 |
| Maltodextrin Maltrin M180 | 4.4 |
| Tri-Sodium Citrate Di-Hydrate | 0.17 |
| Tri-Potassium Citrate Monohydrate | 0.19 |

TABLE 7-continued

Exemplary high protein liquid nutritional formulation

| | 13.8% protein w/w |
|---|---|
| Potassium Chloride | 0.08 |
| Magnesium Chloride | 0.16 |
| Tri-Calcium Phosphate | 0.24 |
| Novagel GP2180 (microcrystalline cellulose) | 0.35 |
| Lecithin | 0.20 |
| Corn Oil | 11.23 |
| Antifoam | 0.005 |
| Total batch size | 100 |

The pH of the formulation was adjusted to pH 5.4 or pH 6.8 prior to heat treatment applied to provide microbial control. The viscosity, particle size, creaming and sedimentation of the formulation at pH 5.4 were determined after UHT treatment by DSI or indirect steam at a temperature of 140° C. for 15 seconds, and following subsequent homogenisation.

Results

At pH 6.8, the formulation could not be processed by given heat treatment (140° C. for 15 seconds) because of fouling and blocking of the plant. At pH 5.4, the formulation did not gel; creaming, viscosity and sedimentation remained acceptable following heat treatment and subsequent homogenisation (Table 8).

Figure 6:
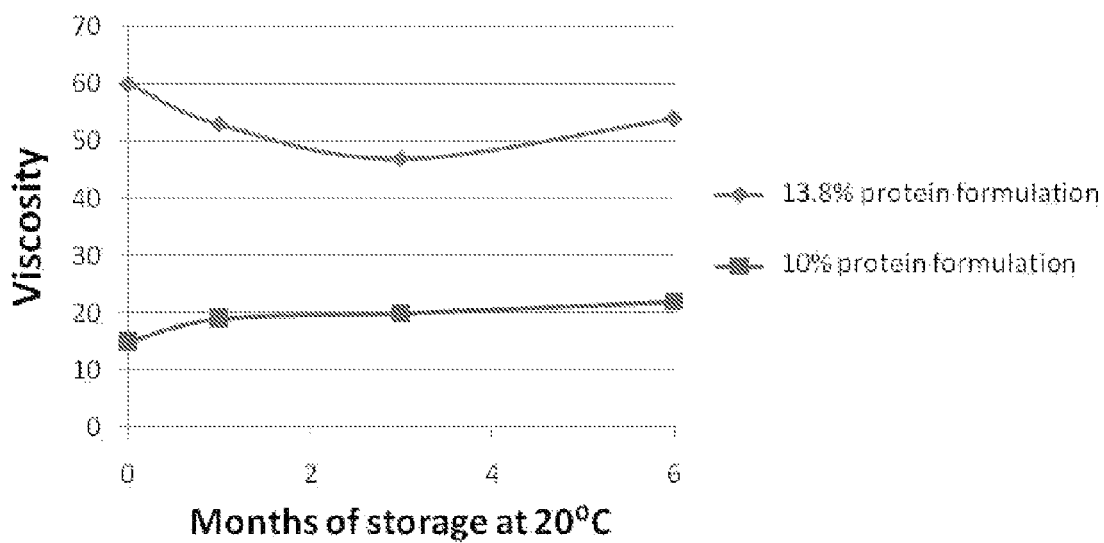
FIG. 6 shows the storage stability of nutritional formulations comprising 10% and 13.8% protein by weight at pH 5.4.

The formulation comprising 13.8% protein of this example, and the formulation of Example 2 comprising 10% protein maintained their viscosity after 6 months of storage following heat treatment as shown in FIG. 6.

TABLE 8

Heat stability of exemplary high protein liquid nutritional formulation

| | TS % | Sedimentation (%) | Cream (%) | Viscosity (cP @ 100 s$^{-1}$) | D [3, 2] (μm) | D [4,3] (μm) |
|---|---|---|---|---|---|---|
| Recombined base | 40.8 | 0.96 | 0.33 | 66.5 | 0.25 | 0.66 |
| UHT/DSI treatment | 40.9 | 2.01 | 1.83 | 44.7 | 0.36 | 0.92 |
| UHT/DSI and post homogenization | 40.6 | 2.07 | 0.65 | 41.8 | 0.30 | 0.75 |

TABLE 8-continued

Heat stability of exemplary high protein liquid nutritional formulation

| | TS % | Sedimentation (%) | Cream (%) | Viscosity (cP @ 100 s$^{-1}$) | D [3, 2] (μm) | D [4,3] (μm) |
|---|---|---|---|---|---|---|
| UHT/indirect treatment | 40.9 | 0.72 | 3.46 | 72.4 | 0.51 | 2.17 |
| UHT/indirect and post homogenization | 41.1 | 1.35 | 0.43 | 59.5 | 0.33 | 0.85 |

This result indicates that the liquid nutritional formulations of the invention are heat stable following heat treatment applied to provide microbial control at pH 4-6 and are stable over long term storage.

Example 6

Heat Stability of Exemplary Liquid Nutritional Formulation with High Mineral Content This example demonstrates the heat stability at pH 4-6 of exemplary liquid nutritional compositions with increasing mineral levels.

Methods

Liquid nutritional formulations at 1.6 kcal/mL were prepared comprising 10% protein in the form of powder A, with differing mineral content as shown in Table 9. The levels of minerals (sodium, potassium, calcium, phosphorous, magnesium, chloride) were selected according to the European Commission guideline on Food for Special Medical Purposes (FSMP) directive. For each mineral, the minimum and maximum concentrations were used according to the recommended levels, as well as the mid-point was calculated.

TABLE 9

Mineral content of exemplary high protein liquid nutritional formulations

| | Min mineral levels | Mid-point of the recommendations | Max mineral levels |
|---|---|---|---|
| Water | 70.92 | 70.92 | 70.92 |
| Protein powder A | 11.66 | 11.66 | 11.66 |
| Sugar | 5.18 | 5.18 | 5.18 |
| Maltodextrin Maltrin M18 | 5.18 | 5.18 | 5.18 |
| SeaKem (carrageenan) | 0.05 | 0.05 | 0.05 |
| Novagel GP 2180 (microcrystalline cellulose) | 0.20 | 0.20 | 0.20 |
| Lecithin | 0.15 | 0.15 | 0.15 |
| Canola Oil | 6.66 | 6.66 | 6.66 |
| Tri-Sodium Citrate Dihydrate | 0.08 | 0.54 | 0.99 |
| Tri-Potassium Citrate Dihydrate | 0.01 | 0.18 | 0.35 |
| Potassium Chloride | 0.05 | 0.24 | 0.42 |
| Tri-Calcium Phosphate | 0.06 | 0.30 | 0.56 |
| Magnesium Chloride | 0.03 | 0.14 | 0.25 |
| Total | 100 | 100 | 100 |

The pH of each formulation was adjusted to a pH in the range of pH 4.8, 5.1, 5.4 and 7.0. Coagulation time of the formulations was assessed during heating in an oil bath at 140° C.

Results

At pH 4.8, 5.1 and 5.4, all formulations had long coagulation times as shown in Table 10.

TABLE 10

Coagulation time (seconds) at 140° C. of exemplary high protein liquid nutritional formulations with added minerals

| Formulation | pH 4.8 | pH 5.1 | pH 5.4 | pH 7.0 |
|---|---|---|---|---|
| Min minerals | 150 | 357 | 372 | 79 |
| Mid-point minerals | 297 | 193 | 107 | 59 |
| Max minerals | 162 | 130 | 83.5 | 53 |

| Predictive behaviour of formulations at UHT based on heat coagulation times (s) | |
|---|---|
| >80 Sec | Stable at UHT |
| 65-80 Sec | Might cause fouling |
| <65 Sec | Not stable at UHT |

These results indicate that liquid nutritional formulations of the invention with high mineral content are heat stable following heat treatment at pH 4-6 compared to neutral pH. This provides considerable flexibility to producers of medical foods to adjust their composition of the nutritional compositions. Some nutritional compositions may require to contain high concentrations of ions to comply with specific nutritional benefits (bone health, hydration etc.)

Example 7

Heat Stability of Exemplary Liquid Nutritional Formulation with High Protein Content (20 g Protein/100 mL)

This example investigated the heat stability at pH 4-6 of exemplary liquid nutritional formulations with high protein content.

Methods

Liquid nutritional formulations at 2.4 kcal/mL were prepared comprising 20% protein in the form of Powder A, on the basis of the recipe shown in Table 11. A flow chart of the process is shown in FIG. 1.

TABLE 11

Exemplary high protein liquid nutritional formulation

| | Composition |
|---|---|
| Protein | 20% |
| Fat | 13% |
| Carbohydrate | 11% |
| Energy | 2.4 kcal/mL |

| Formulation | % |
|---|---|
| Water | 57.3 |
| Protein powder A | 23.4 |
| Sucrose | 4.2 |

TABLE 11-continued

Exemplary high protein liquid nutritional formulation

| | |
|---|---|
| Maltodextrin IT47 | 4.2 |
| Lecithin | 0.2 |
| Canola Oil | 10.7 |

The pH of the formulation was adjusted to pH 5.0 and the formulation was subjected to heat treatment in a minipasteuriser equipped with a plate heat exchanger for indirect heating at 90° C. for 30 seconds. Process conditions were as follows: the flow rate was 30 liters/hour preheat temperature was 70° C.; heat treatment was 90° C. for 30 s, filling temperature was 4° C. The plant was run for 5 minutes prior to filling to ensure that all of the water was flushed out of the system. Product was filled into 200 ml PET jars and stored at ambient temperature until required. The viscosity and particle size of the formulation were measured before and after heat treatment.

Results

The formulation was successfully heat treated without fouling of the minipasteuriser. The formulation did not gel following heat treatment and there was no significant change in viscosity or particle size as shown in Table 12, indicating the formulation withstood heat treatment without any changes to its physical properties.

TABLE 12

Heat stability of exemplary high protein liquid nutritional formulation

| | Viscosity (cP) at 100 s$^{-1}$ | $d_{43}$ (µm) | $d_{32}$ (µm) |
|---|---|---|---|
| Recombined base | 193 | 0.74 | 0.29 |
| Heated at 90° C. for 30 s | 157 | 0.78 | 0.29 |

These results indicate that liquid nutritional formulations of the invention with high protein content are heat stable following heat treatment at pH 4-6.

Example 8

Exemplary Liquid Nutritional Formulation in Smoothie Form

This example describes the preparation of an exemplary liquid nutritional formulation in the form of a smoothie.

Methods

Smoothies were prepared comprising 5% protein in the form of powder A, WPI 895 or WPC 392, 1% pectin, 10% sucrose and no added fat.

The sucrose was divided into two portions: the first portion of sucrose was dry blended with the pectin in the ratio of 1 part gum to 5 parts sucrose, the remaining sucrose was dry blended with the protein ingredients. The protein/sucrose blend was recombined into ambient reverse osmosis water equal to approximately 45% of the final weight and stirred for a further 60 minutes to fully hydrate. The pectin/sucrose blend was added with constant stirring to RO water (approximately 35% of the final weight) at 60-70° C. and stirred for a further 30 minutes in order to fully hydrate. The pectin mix was then added to the protein mix and allowed to mix for 5 minutes. A 1:1 blend of 50% citric and 50% lactic acid was then added rapidly with stirring to bring down the pH to 4.0. The mixture was adjusted to the final weight with RO water, then homogenised at 150/50 bar in an APV Rannie homogenises.

Smoothies were heat treated in a minipasteurizer equipped with a plate heat exchanger for indirect heating. Process conditions were as follows: the flow rate was 30 liters/hour preheat temperature was 70° C.; heat treatment was 90° C. for 30 s, filling temperature was 4° C. The plant was run for 5 minutes prior to filling to ensure that all of the water was flushed out of the system. Product was filled into 200 mL PET jars and stored at ambient temperature until required.

Samples were assessed for separation, sedimentation and viscosity at time zero and after 3 months storage at 30° C.

Results

Figure 7A:
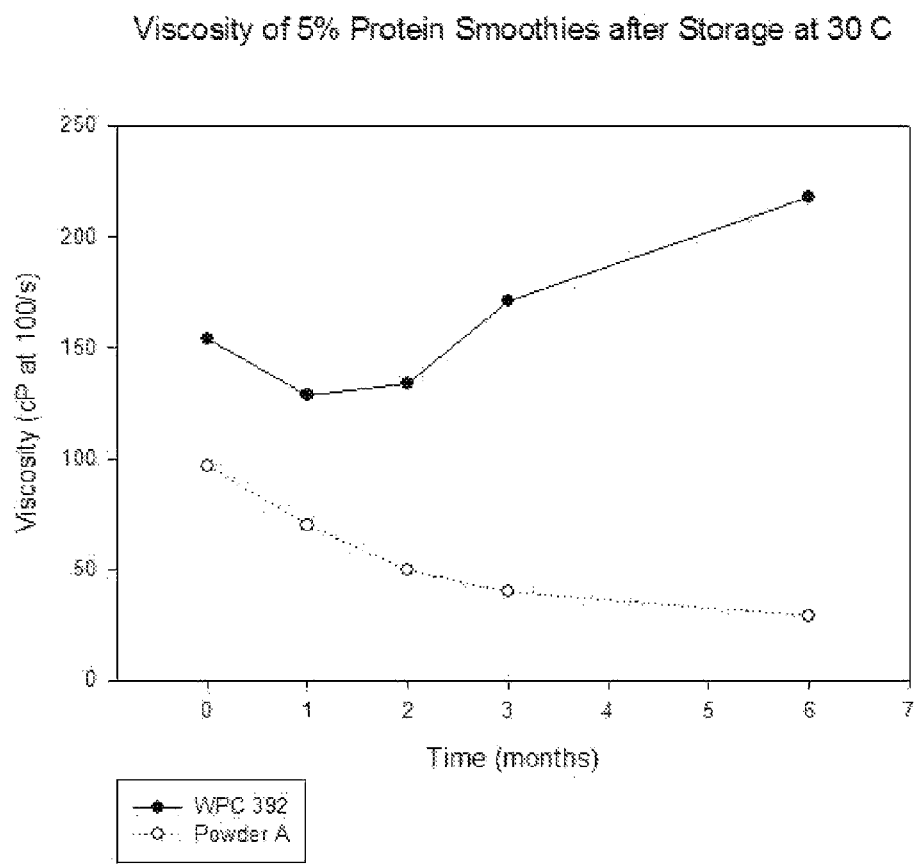
FIG. 7 depicts liquid nutritional formulations of the invention in smoothie form: a) viscosity over storage at 30° C.; b) sediment after 3 months at 30° C.
Figure 7B:
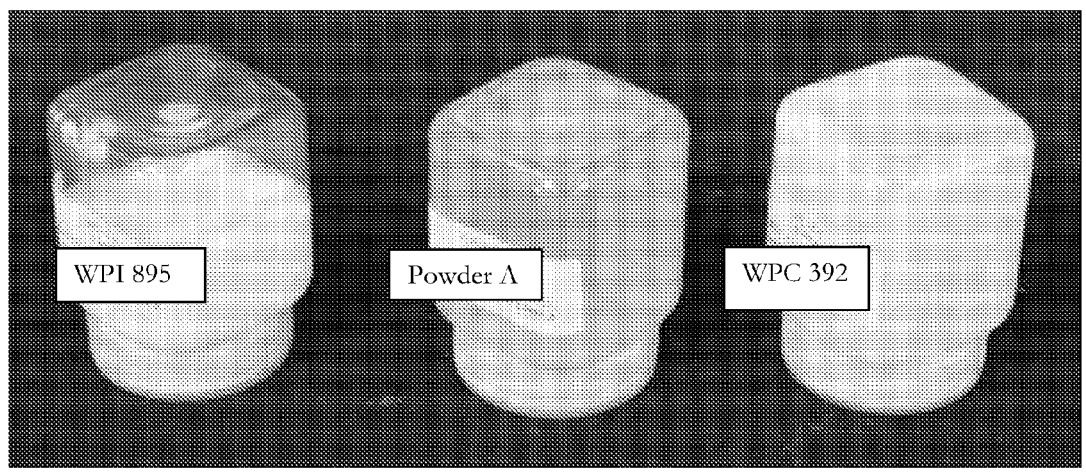

The viscosity of the smoothies over three months is shown in FIG. 7A. The smoothie comprising WPI 895 showed very rapid separation and sedimentation on storage at 30° C., therefore the viscosity was not measured. The smoothie comprising WPC 392 did not separate but formed particles over time (FIG. 7B) and also began to increase in viscosity after the second month, which would detract from the mouthfeel of the product. The smoothie comprising denatured protein (powder A) retained a low viscosity and did not separate. The viscosity of the product decreased with time, but appeared to be stabilising after three months.

Informal sensory analysis of the smoothies showed that the formulation comprising powder A had superior organoleptic properties to the smoothies comprising WPI 895 and WPC 392. At 5% protein the WPI 895 was more astringent, whereas the WPC 392 had both high astringency and wet wool notes.

These results demonstrate that liquid nutritional formulations of the invention in smoothie form are stable following heat treatment at pH 4 and retain optimal viscosity and organoleptic properties following storage.

Example 9

Exemplary Liquid Nutritional Formulations Comprising 55% Denatured Protein Blends This example investigated the heat stability at pH 5.4 of liquid formulations comprising 55% denatured protein. The formulations comprised a protein blend of denatured, and undenatured or hydrolysed proteins.

Methods

Liquid nutritional formulations of Table 13 were prepared as per FIG. 1. To obtain a nominal 55% denaturation level, powder A (comprising 75% denatured protein) was mixed with other protein sources at a ratio of 75:25. For example, to prepare a 4% protein formulation, 3% of the protein was provided by powder A, while 1% was obtained from other protein sources (whey protein isolate (WPI), whey protein hydrolysate (WPH), whey protein concentrate (WPC) or soy protein isolate (SPI). Heat stability testing was conducted by retorting at 121° C. for 10 min. After retorting, the visual appearance of every sample was noted. If any of the samples after retorting were still liquid, and no visible aggregates were seen, then they were tested for viscosity and particle size.

TABLE 13

Liquid nutritional formulations comprising protein blends of 55% protein denaturation

|  | Formula 1 Powder A (100%) | Formula 2 Powder A + WPI (75:25) | Formula 3 Powder A + WPH (75:25) | Formula 4 Powder A + WPC (75:25) | Formula 5 Powder A + SPI (75:25) |
|---|---|---|---|---|---|
| Water | 82.34 | 82.54 | 82.52 | 82.36 | 82.46 |
| Powder A (79.1% protein) | 5.06 | 3.79 | 3.79 | 3.79 | 3.79 |
| WPI 895 (93.9% protein) | 0.00 | 1.06 | 0.00 | 0.00 | 0.00 |
| WPH 821 (91.9% protein) | 0.00 | 0.00 | 1.09 | 0.00 | 0.00 |
| WPC 392 (80.1% protein) | 0.00 | 0.00 | 0.00 | 1.25 | 0.00 |
| SPI Supro (87% protein) | 0.00 | 0.00 | 0.00 | 0.00 | 1.15 |
| Sucrose | 4.20 | 4.20 | 4.20 | 4.20 | 4.20 |
| Maltodextrin Maltrin M18 | 6.30 | 6.30 | 6.30 | 6.30 | 6.30 |
| Lecithin | 0.10 | 0.10 | 0.10 | 0.10 | 0.10 |
| Canola Oil | 2.00 | 2.00 | 2.00 | 2.00 | 2.00 |
| Total | 100.00 | 100.00 | 100.00 | 100.00 | 100.00 |

Results

The visual assessment, viscosity and particle size of the formulations after retort treatment is shown in Table 14. The results show that when Powder A was blended with other proteins to achieve a nominal 55% denatured whey protein level, the blends had substantially longer heat coagulation times than WPC392 at pH 5.4.

The results indicated that the blends providing a nominal 55% denatured whey protein were heat stable to retort process and samples did not gel after heating at 121° C. for 10 min with the exception of the formulation comprising Powder A+SPI (formula 5) that was not stable after retorting at pH 5.4.

TABLE 14

Assessments of liquid nutritional formulations comprising protein blends after retorting at 121° C. for 10 min.

|  | Formula 1 Powder A (100%) | Formula 2 Powder A + WPI (75:25) | Formula 3 Powder A + WPH (75:25) | Formula 4 Powder A + WPC (75:25) | Formula 5 Powder A + SPI (75:25) |
|---|---|---|---|---|---|
| Visual assessment | Liquid | Liquid | Liquid | Liquid | Coagulated, large aggregates |
| Viscosity cP at 100 s$^{-1}$ | 2.9 | 3.1 | 2.8 | 3.2 | n.d. |
| Particle size d[4,3] µm | 1.01 | 1.06 | 1.15 | 1.17 | n.d |
| Particle size d[3,2] µm | 0.39 | 0.33 | 0.38 | 0.38 | n.d. |

These results demonstrate that liquid nutritional formulations comprising blends of different protein powders to obtain a minimal 55% protein denaturation level showed improved stability to heating at pH 5.4 compared with native WPC. One skilled in the art would know to adjust blending ratios if powders have different denaturation levels.

Example 10

Heat Stability of Exemplary Liquid Nutritional Formulations Comprising Denatured WPC Ingredients with Varying Protein Concentration This example describes the preparation of an exemplary liquid nutritional formulation comprising denatured WPC ingredient of varying protein concentration.

Methods

Four denatured whey protein powders with a protein content of 28%, 51%, 67% and 81% by weight were prepared (powders J-M in Table 2). Liquid nutritional formulations comprising the powders were prepared according to Table 15 according to the method of FIG. 1. Each formulation comprised a final protein concentration of 4% by weight. The formulations were homogenized at 250/50 bar twice, and the pH of each beverage was adjusted in the range 4.3 to 5.8 prior to heat treatment.

TABLE 15

Liquid nutritional formulations comprising powders of varying protein content

|  | Formula 1 Powder A | Formula 2 Powder J | Formula 3 Powder K | Formula 4 Powder L | Formula 5 Powder M |
|---|---|---|---|---|---|
| Water | 82.34 | 72.89 | 79.60 | 81.40 | 82.49 |
| Powder A | 5.06 | 0.00 | 0.00 | 0.00 | 0.00 |
| Powder J | 0.00 | 14.51 | 0.00 | 0.00 | 0.00 |
| Powder K | 0.00 | 0.00 | 7.80 | 0.00 | 0.00 |
| Powder L | 0.00 | 0.00 | 0.00 | 6.00 | 0.00 |
| Powder M | 0.00 | 0.00 | 0.00 | 0.00 | 4.91 |
| Sucrose | 4.20 | 4.20 | 4.20 | 4.20 | 4.20 |
| Maltodextrin Maltrin M18 | 6.30 | 6.30 | 6.30 | 6.30 | 6.30 |
| Lecithin | 0.10 | 0.10 | 0.10 | 0.10 | 0.10 |
| Canola Oil | 2.00 | 2.00 | 2.00 | 2.00 | 2.00 |
| Total | 100.00 | 100.00 | 100.00 | 100.00 | 100.00 |

Heat stability testing was conducted by heating in an oil bath at 90° C., 120° C. and 140° C. as shown in Table 16. All samples were tested for retort stability at 121° C. for 10 minutes. After retorting, the visual appearance of each sample was assessed. Samples that were still in liquid form with no visible aggregates were evaluated for viscosity and particle size (Table 17).

Results

All denatured whey protein powders showed substantial heat stability compared to native WPC (392) as shown in heat coagulation test in the oil bath at 90° C. 120° C. and 140° C. (Table 16). Powder J was the least heat stable among all the powders and had the shortest heat coagulation times at all temperatures. However, this powder had a whey protein denaturation level below 55% (46%, Table 2).

Formulations that were stable to heat processing at pH 5.4 showed minimal increases in mean particle size and viscosity as a result of retorting and would be considered commercially acceptable. Overall, the denatured WPC powders comprising protein contents of 51% to 81% with similar whey protein denaturation levels provided better heat stability compared with native WPC (392). The result demonstrates that protein content of WPC must be above 28%, while the denaturation level is above 55%.

TABLE 16

Coagulation times of liquid nutritional formulations comprising powders of varying protein content during heat treatment at 90° C., 120° C. and 140° C.

|  | pH 4.3 | pH 4.8 | pH 5.1 | pH 5.4 | pH 5.8 |
|---|---|---|---|---|---|
| 90° C. oil bath |  |  |  |  |  |
| Powder A | >30 min | >30 min | >30 min | >30 min | >30 min |
| Powder J | 714 s | 675 s | 657 s | 530 s | 315 s |
| Powder K | 1558 s | >30 min | >30 min | >30 min | 920 s |
| Powder L | 1089 s | >30 min | >30 min | >30 min | >30 min |
| Powder M | 532 s | >30 min | >30 min | >30 min | >30 min |
| WPC 392 | 42 s | 40 s | 40 s | 40 s | 40 s |
| 120° C. oil bath |  |  |  |  |  |
| Powder A | 105 s | 408 s | 621 s | 330 s | 166 s |
| Powder J | 106 s | 115 s | 87 s | 62 s | 53 s |
| Powder K | 192 s | 332 s | 100 s | 104 s | 73 s |
| Powder L | 171 s | 467 s | 467 s | 233 s | 114 s |
| Powder M | 173 s | 185 s | 491 s | 255 s | 182 s |
| WPC 392 | 34 s | 36 s | 37 s | 40 s | 42 s |
| 140° C. oil bath |  |  |  |  |  |
| Powder A | 71 s | 120 s | 94 s | 88 s | 70 s |
| Powder J | 72 s | 61 s | 55 s | 39 s | 32 s |
| Powder K | 93 s | 93 s | 78 s | 59 s | 52 s |
| Powder L | 92 s | 108 s | 100 s | 74 s | 59 s |
| Powder M | 83 s | 105 s | 101 s | 79 s | 65 s |
| WPC 392 | 26 s | 27 s | 29 s | 29 s | 39 s |

TABLE 17

Visual assessment of liquid nutritional formulations comprising denatured WPC powders of varying protein content after retorting at 120° C. for 10 min.

|  | Formula 1 Powder A | Formula 2 Powder J | Formula 3 Powder K | Formula 4 Powder L | Formula 5 Powder M |
|---|---|---|---|---|---|
| Visual assessment | Liquid, no visible fine particles | Phase separation, large coagulated particles | Liquid, no visible fine particles | Liquid, no visible fine particles | Liquid, no visible fine particles |
| Viscosity cP at 100 s$^{-1}$ | 3.04 | n.d. | 3.93 | 3.24 | 2.99 |
| Particle size d[4,3] μm | 1.08 | n.d. | 2.9 | 1.62 | 1.57 |
| Particle size d[3,2] μm | 0.36 | n.d. | 0.59 | 0.43 | 0.45 |

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is not the intention to limit the scope of the invention to the abovementioned examples only. As would be appreciated by a skilled person in the art, many variations are possible without departing from the scope of the invention. For example, the percentage protein and the heat treatment of the WPC can be varied, as can the nature and proportions of the other components of the nutritional composition.

The invention claimed is:

1. A method of preparing a liquid nutritional composition, the method comprising
   a) heat-treating a liquid composition having a pH of between 4 and 6 and comprising about 2% to about 25% by weight of non-hydrolysed whey protein, wherein the whey protein comprises or is provided by an ingredient that comprises at least about 55% of the heat-denaturable protein present in a denatured state, and wherein the heat treatment has an $F_0$-value of at least equivalent to 90° C. for 40 s, and
   b) recovering the liquid composition,
   wherein the recovered liquid composition has
   c) a viscosity of less than 200 cP when measured at 20° C. and shear rate of 100 s-1, or
   d) an average particle size of less than 20 μm as categorised by the volume weighted average particle size parameter D[4,3], or
   e) exhibits essentially no observable gelation or aggregation, or
   f) any combination of two or more of (c) to (e) above.

2. The method of claim 1 wherein the heat treatment is at least equivalent to 121° C. for 10 minutes.

3. The method of claim 2 wherein the heat treatment is at least equivalent to 140° C. for 5 s.

4. The method of claim 1 wherein the liquid nutritional composition exhibits no observable gelation, or no observable aggregation, or both, after storage for at least 3 months at room temperature.

5. The method of claim 1 wherein the liquid nutritional composition comprises:
 a) 30 to 175 mg sodium,
 b) 80 to 295 mg potassium,
 c) 30 to 175 mg chloride,
 d) 35 to 175 mg calcium,
 e) 30 to 80 mg phosphorus,
 f) 7.5 to 25 mg magnesium,
 g) 0.5 to 2.0 mg iron,
 h) 0.5 to 1.5 mg zinc,
 i) 60 to 500 µg copper,
 j) 6.5 to 35 µg iodine,
 k) 2.5 to 10 µg selenium,
 l) 0.05 to 0.5 mg manganese,
 m) 1.25 to 15 µg chromium,
 n) 3.5 to 18 µg molybdenum, and
 o) less than 0.2 mg fluoride
per 100 kcal of the liquid nutritional composition.

6. The method of claim 1 wherein the liquid nutritional composition has when undergoing the heat treatment
 a) a pH of between about 4.7 to about 6.0, or
 b) a pH of between about 4.8 to about 6.0, or
 c) a pH of between about 4.9 to about 6.0, or
 d) a pH of between about 5.0 to about 6.0, or
 e) a pH of between about 4.5 to about 5.7, or
 f) a pH of between about 4.5 to about 5.5, or
 g) a pH of between about 4.5 to about 5.3, or
 h) a pH of between about 4.5 to about 5.2, or
 i) a pH of between about 4.7 to about 5.5, or
 j) a pH of between about 4.7 to about 5.3, or
 k) a pH of between about 4.7 to about 5.2, or
 l) a pH of between about 4.8 to about 5.3, or
 m) a pH of between about 4.8 to about 5.2, or
 n) a pH of about 5, or
 o) a pH of between about 4.2 to about 5.8, or
 p) a pH of between about 4.4 to about 5.8, or
 q) a pH of between about 4.6 to about 5.6, or
 r) a pH of between about 4.8 to about 5.4, or
 s) a pH of between about 4.9 to about 5.3, or
 t) a pH of between about 5.0 to about 5.2, or
 u) a pH of about 5.1, or
 v) a pH of between about 4.3 to about 5.1, or
 w) a pH of between about 4.6 to about 5.1, or
 x) a pH of between about 4.8 to about 5.1, or
 y) a pH of between about 5.1 to about 6.0, or
 z) a pH of between about 5.1 to about 5.8, or
 aa) a pH of between about 5.1 to about 5.6, or
 bb) a pH of between about 5.1 to about 5.4.

7. The method of claim 1 wherein the liquid nutritional composition has when undergoing the heat treatment
 a) a pH of between about 4.1 to about 5.1, or
 b) a pH of between about 4.3 to about 5.1, or
 c) a pH of between about 4.5 to about 5.1, or
 d) a pH of between about 4.7 to about 5.1, or
 e) a pH of between about 4.9 to about 5.1, or
 f) a pH of between about 5.1 to about 6.0, or
 g) a pH of between about 5.1 to about 5.8, or
 h) a pH of between about 5.1 to about 5.6, or
 i) a pH of between about 5.1 to about 5.4, or
 j) a pH of between about 5.1 to about 5.2, or
 k) a pH of about 5.1.

8. The method of claim 1 wherein the liquid nutritional composition has when undergoing the heat treatment a pH of about 5.4.

9. The method of claim 1 wherein the liquid nutritional composition has when undergoing the heat treatment a pH of about 5.1.

10. The method of claim 1 wherein the liquid nutritional composition has when undergoing the heat treatment a pH of within about 0.5 of the average pI of the protein, or
 a) a pH of within about 0.3 of the average pI of the protein, or
 b) a pH of within about 0.1 of the average pI of the protein, or
 c) a pH at about the average pI of the protein.

11. The method of claim 1 wherein the non-hydrolysed whey protein is provided by a dry ingredient that comprises a protein content of 35% to 95% by weight of the dry matter of the ingredient.

12. A liquid nutritional composition comprising
 a) from about 2% to about 25% by weight of non-hydrolysed whey protein, wherein the whey protein comprises or is provided by an ingredient that comprises at least about 55% of the heat-denaturable protein present in a denatured state,
 b) from 0 to about 30% by weight fat
 c) from about 0% to about 45% by weight carbohydrate
and wherein the nutritional composition has when at a pH of between 4 and 6 undergone a heat treatment with an $F_0$-value of at least equivalent to 90° C. for 40 s, and has
 d) a viscosity of less than 200 cP when measured at 20° C. and shear rate of 100 s-1, or
 e) an average particle size of less than 20 µM as categorised by the volume weighted average particle size parameter D[4,3], or
 f) exhibits essentially no observable gelation or aggregation, or
 g) any combination of two or more of (d) to (f) above.

13. The liquid nutritional composition of claim 12 wherein the nutritional composition has a pH of between about 4 to about 6, and a viscosity of less than 200 cP at a temperature of 20° C. and a shear rate of 100 $s^{-1}$ and exhibits essentially no gelation or aggregation.

14. The liquid nutritional composition of claim 12 wherein the liquid nutritional composition has a viscosity of less than 150 cP at a temperature of 20° C. and a shear rate of 100 $s^{-1}$.

15. The liquid nutritional composition of claim 12 wherein the liquid nutritional composition has a viscosity of less than 50 cP at a temperature of 20° C. and a shear rate of 100 $s^{-1}$.

16. The liquid nutritional composition of claim 12 having
 a) a pH of within about 0.5 of the average pI of the protein, or
 b) a pH of within about 0.3 of the average pI of the protein, or
 c) a pH of within about 0.1 of the average pI of the protein, or
 d) a pH at about the average pI of the protein.

17. A powdered nutritional composition dispersible in water to form a liquid nutritional composition of claim 12.

18. A method of providing nutrition to a person in need thereof, the method comprising the steps of administering to the person a nutritional composition of claim 12.

19. A food or food product comprising, consisting essentially of, or consisting of a liquid nutritional composition of claim 12.

* * * * *